(12) United States Patent
Ginetti et al.

(10) Patent No.: US 10,909,302 B1
(45) Date of Patent: Feb. 2, 2021

(54) METHOD, SYSTEM, AND COMPUTER PROGRAM PRODUCT FOR CHARACTERIZING ELECTRONIC DESIGNS WITH ELECTRONIC DESIGN SIMPLIFICATION TECHNIQUES

(71) Applicant: Cadence Design Systems, Inc., San Jose, CA (US)

(72) Inventors: Arnold Jean Marie Gustave Ginetti, Antibes (FR); Steve Song Lee, San Jose, CA (US); Sutirtha Kabir, Chandler, AZ (US); Jean-Noel Francois Philippe Marie Pic, Valbonne (FR); Xavier Alasseur, Ajaccio (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/569,575

(22) Filed: Sep. 12, 2019

(51) Int. Cl.
| | |
|---|---|
| *G06F 30/398* | (2020.01) |
| *G06F 30/39* | (2020.01) |
| *G06F 30/367* | (2020.01) |
| *G06F 30/392* | (2020.01) |
| *G06F 30/33* | (2020.01) |
| G06F 30/20 | (2020.01) |
| G06F 119/18 | (2020.01) |

(52) U.S. Cl.
CPC ............ *G06F 30/398* (2020.01); *G06F 30/33* (2020.01); *G06F 30/367* (2020.01); *G06F 30/39* (2020.01); *G06F 30/392* (2020.01); *G06F 30/20* (2020.01); *G06F 2119/18* (2020.01)

(58) Field of Classification Search
CPC ........ G06F 30/327; G06F 30/20; G06F 30/30; G06F 30/33; G06F 8/10; G06F 30/398; G06F 30/367; G06F 2111/04; G06F 2111/20; G06F 30/39; G06F 30/392; G06F 2119/18
See application file for complete search history.

(56) References Cited

U.S. PATENT DOCUMENTS

| | | | |
|---|---|---|---|
| 6,068,660 | A | 5/2000 | Lu |
| 6,084,779 | A | 7/2000 | Fang |
| 6,285,973 | B1 | 9/2001 | Nishina |

(Continued)

FOREIGN PATENT DOCUMENTS

KR  20080045826 A  *  5/2008  ............. G06F 30/39

OTHER PUBLICATIONS

Delakoura Angeliki, "3D Standard-Cell Placement Based on Circuit Partitioning", University of Thessaly, Jun. 2016.

(Continued)

*Primary Examiner* — Helen Rossoshek
(74) *Attorney, Agent, or Firm* — Vista IP Law Group, LLP

(57) ABSTRACT

Disclosed are methods, systems, and articles of manufacture for characterizing electronic designs with electronic design simplification techniques. These techniques identify an input for simplifying an electronic design and generates a simplified electronic design at least by performing layout simplification on the electronic design. A characterization input may be determined for subsequent characterization of the simplified electronic design. An electromagnetic behavior of the simplified electronic design may then be characterized using at least the characterization input.

20 Claims, 17 Drawing Sheets

(56) References Cited

U.S. PATENT DOCUMENTS

| | | | |
|---|---|---|---|
| 6,567,960 B2* | 5/2003 | Chang | G06F 30/367 716/113 |
| 6,598,208 B2* | 7/2003 | Sasaki | G06F 30/367 716/115 |
| 7,131,105 B2 | 10/2006 | Lorenz et al. | |
| 7,322,019 B2* | 1/2008 | Sato | G06F 30/367 716/112 |
| 7,467,077 B2 | 12/2008 | Hirai | |
| 7,509,247 B2 | 3/2009 | Jiao | |
| 7,669,164 B1 | 2/2010 | Ma | |
| 7,698,665 B2* | 4/2010 | Abrams | G03F 1/68 716/55 |
| 7,865,850 B1* | 1/2011 | Kao | G06F 30/367 716/136 |
| 7,930,672 B2* | 4/2011 | Baumgartner | G06F 30/30 716/132 |
| 8,065,101 B2* | 11/2011 | Nishino | G06F 30/367 702/66 |
| 8,126,650 B2 | 2/2012 | Lu | |
| 8,255,849 B1 | 8/2012 | Okhmatovski | |
| 8,326,591 B1* | 12/2012 | Cai | G06F 30/367 703/13 |
| 8,468,482 B1 | 6/2013 | Pack et al. | |
| 8,539,422 B2 | 9/2013 | Dai | |
| 8,631,381 B2 | 1/2014 | Dai | |
| 8,639,487 B1* | 1/2014 | Ezer | G06F 30/327 703/14 |
| 8,667,450 B2* | 3/2014 | Wang | G06F 30/398 716/136 |
| 8,682,625 B2 | 3/2014 | Liu et al. | |
| 8,694,568 B2 | 4/2014 | Li et al. | |
| 8,874,422 B2 | 10/2014 | Liu et al. | |
| 8,881,078 B2* | 11/2014 | Ting | G06F 30/30 716/107 |
| 8,954,308 B2 | 2/2015 | Choi | |
| 9,047,424 B1* | 6/2015 | Baker | G06F 30/367 |
| 9,268,429 B2* | 2/2016 | Hotelling | G02F 1/13338 |
| 9,305,124 B2 | 4/2016 | Han | |
| 1,013,384 A1 | 9/2016 | Majumder et al. | |
| 9,542,515 B2 | 1/2017 | Liu et al. | |
| 9,672,308 B1 | 6/2017 | Majumder | |
| 9,672,319 B1 | 6/2017 | Cao et al. | |
| 9,715,569 B1* | 7/2017 | Liu | G06F 30/398 |
| 9,715,570 B1 | 7/2017 | Zhu | |
| 9,773,086 B1 | 9/2017 | Liu et al. | |
| 9,785,141 B2 | 10/2017 | Tripathi et al. | |
| 9,864,827 B1 | 1/2018 | Tan et al. | |
| 10,031,986 B1* | 7/2018 | Kumar | G06F 30/367 |
| 10,068,039 B1* | 9/2018 | Vennam | G06F 30/392 |
| 1,019,202 A1 | 1/2019 | Ginetti | |
| 1,021,029 A1 | 2/2019 | Ginetti | |
| 1,038,029 A1 | 8/2019 | Liu et al. | |
| 10,635,770 B1* | 4/2020 | Wu | G06F 30/327 |
| 1,076,226 A1 | 9/2020 | Liu et al. | |
| 2002/0042698 A1 | 4/2002 | Meuris | |
| 2003/0114944 A1 | 6/2003 | Bernstein | |
| 2005/0064299 A1 | 3/2005 | Lu | |
| 2005/0076317 A1 | 4/2005 | Ling | |
| 2005/0089770 A1 | 4/2005 | Liu | |
| 2006/0009953 A1 | 1/2006 | Okada | |
| 2007/0011648 A1* | 1/2007 | Abrams | G03F 7/705 716/51 |
| 2008/0072182 A1 | 3/2008 | He | |
| 2008/0097641 A1 | 4/2008 | Miyashita | |
| 2008/0120084 A1 | 5/2008 | Dengi | |
| 2009/0152664 A1* | 6/2009 | Klem | H01L 31/1013 257/440 |
| 2010/0169060 A1 | 7/2010 | Zhu | |
| 2010/0171226 A1 | 7/2010 | West et al. | |
| 2010/0218145 A1 | 8/2010 | Engin | |
| 2010/0312539 A1 | 12/2010 | Yamagajo | |
| 2010/0324878 A1 | 12/2010 | Lee | |
| 2011/0161905 A1* | 6/2011 | Zhao | G06F 30/367 716/115 |
| 2011/0309236 A1* | 12/2011 | Tian | H01L 27/14687 250/208.1 |
| 2012/0185807 A1 | 7/2012 | Tsai | |
| 2012/0200566 A1 | 8/2012 | Chernikov | |
| 2012/0269230 A1 | 10/2012 | Li et al. | |
| 2012/0271602 A1 | 10/2012 | Han | |
| 2013/0006584 A1 | 1/2013 | Liu et al. | |
| 2013/0124181 A1 | 5/2013 | Liu et al. | |
| 2013/0138402 A1 | 5/2013 | Fang et al. | |
| 2013/0138417 A1 | 5/2013 | Liu et al. | |
| 2013/0298101 A1 | 11/2013 | Chandra | |
| 2014/0257784 A1 | 9/2014 | Kwon | |
| 2014/0282328 A1 | 9/2014 | Fried et al. | |
| 2015/0058816 A1 | 2/2015 | Sakanushi | |
| 2015/0269297 A1* | 9/2015 | Tuan | G06F 30/367 716/106 |
| 2016/0171149 A1* | 6/2016 | Alloatti | G06F 30/392 716/52 |
| 2016/0180007 A1 | 6/2016 | Svizhenko | |
| 2016/0342729 A1 | 11/2016 | Visvardis | |
| 2016/0350445 A1* | 12/2016 | Dowski, Jr. | G02B 27/0025 |
| 2019/0034574 A1* | 1/2019 | Zhu | G06F 30/392 |

OTHER PUBLICATIONS

Ahn, Byung-Gyu, et al. "Effective estimation method of routing congestion at floorplan stage for 3D ICs." JSTS: Journal of Semiconductor Technology and Science 11.4 (2011): 344-350.

U.S. Appl. No. 16/024,655, filed Jun. 29, 2018.

U.S. Appl. No. 16/147,762, filed Sep. 30, 2018.

Lei et al., Chinese Patent Document No. CN 101834153 A, published Sep. 15, 2010, english abstract and 1 drawings only.

M. Abdullah, "Analysis and Design of Coplanar Waveguide for High-Speed Pulse Propagation on Printed Circuit Board", Universiti Sains Malaysia, Sep. 2007.

N. Dib et al., "Theoretical Characterization of Coplanar Waveguide Transmission Lines and Discontinuities", Radiation Lab., University of Michigan, Nov. 1992.

* cited by examiner

METHOD, SYSTEM, AND COMPUTER PROGRAM PRODUCT FOR CHARACTERIZING ELECTRONIC DESIGNS WITH ELECTRONIC DESIGN SIMPLIFICATION TECHNIQUES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A modern electronic design often contains tens or even hundreds of billions of transistors. Due to the extreme complexity and high manufacturing costs, an electronic design usually proceeds through a series of checks and verifications before tapeout. For example, various rigorous analyses such as electromagnetic (EM) simulations may be performed to identify and correct as many issues in the electrical behaviors of the underlying electronic circuit as possible prior to sending the electronic design for manufacturing. Although modern analysis software is capable of faithfully modeling a modern electronic design, characterizing a faithfully modelled electronic design for analyses on even a state-of-the-art modern computer while obtaining reasonably accurate characterization is nearly an impossible task, at least not within a tolerable time period. For example, a faithfully model electronic design may require weeks or even months to converge on a modern computer.

Many approaches have been developed to overcome such a prohibitively long runtime due to the complexity of modern electronic designs. For example, some conventional approaches abandon a true three-dimensional (3D) approach and adopt a pseudo-3D (or 2.5-D) approach by providing thickness information for circuit component models, without actually modeling the circuit components in a true 3D space. Other conventional approaches adopt some design simplification techniques to simplify an electronic design to reduce the memory print and processor cycles in the subsequent analyses.

Nonetheless, these latter conventional approaches require manual efforts to reduce the complexities in an electronic design by a person with full knowledge in the underlying physics of the eventual analyses and thus require a long time period even to reach a simplified electronic design, without knowing how the simplified electronic design will behavior, or whether the electrical behaviors of the simplified electronic design still sufficiently resemble those of the original electronic design.

In addition, these latter conventional approaches are nevertheless inefficient and/or inaccurate in the sense that an electronic design not only requires a long time period to reach a simplified state but is often either overly aggressive to produce inaccurate electrical behaviors or overly conservative to consume prohibitively long runtime. For example, a design team of skilled circuit engineers having thorough knowledge about electromagnetic (EM) simulation may require days or even weeks to reduce a reasonably but not extremely complex electronic design into a simplified electronic design. Therefore, there is a need for an improved method and system for accurately characterizing an electronic design with electronic design simplification techniques. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for characterizing electronic designs with electronic design simplification techniques in one or more embodiments. Some embodiments are directed at a method for characterizing electronic designs with electronic design simplification techniques.

In some embodiments, an input for simplifying an electronic design may be identified; and a simplified electronic design may be generated at least by performing layout simplification on the electronic design. A characterization input may be determined for subsequent characterization of the simplified electronic design. An electromagnetic behavior of the simplified electronic design may then be characterized using at least the characterization input.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various techniques are directed to characterizing electronic designs with electronic design simplification techniques in various embodiments. In these embodiments, the present invention expediently and efficiently clusters a group of electronic circuit components into a single electronic circuit component while flattening the layer in a layout to generate a flattened, clustered layout. One or more simplification techniques are applied to the flattened, clustered layout to generate a simplified layout. Connectivity is extracted based in part or in whole upon the simplified layout; and a model for the layout is built at least by discretizing the simplified layout. The layout may then be characterized by performing one or more analyses (e.g., one or more simulations) on the model using, for example, Kirchhoff circuit equations and the Maxwell equation.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Figure 1:
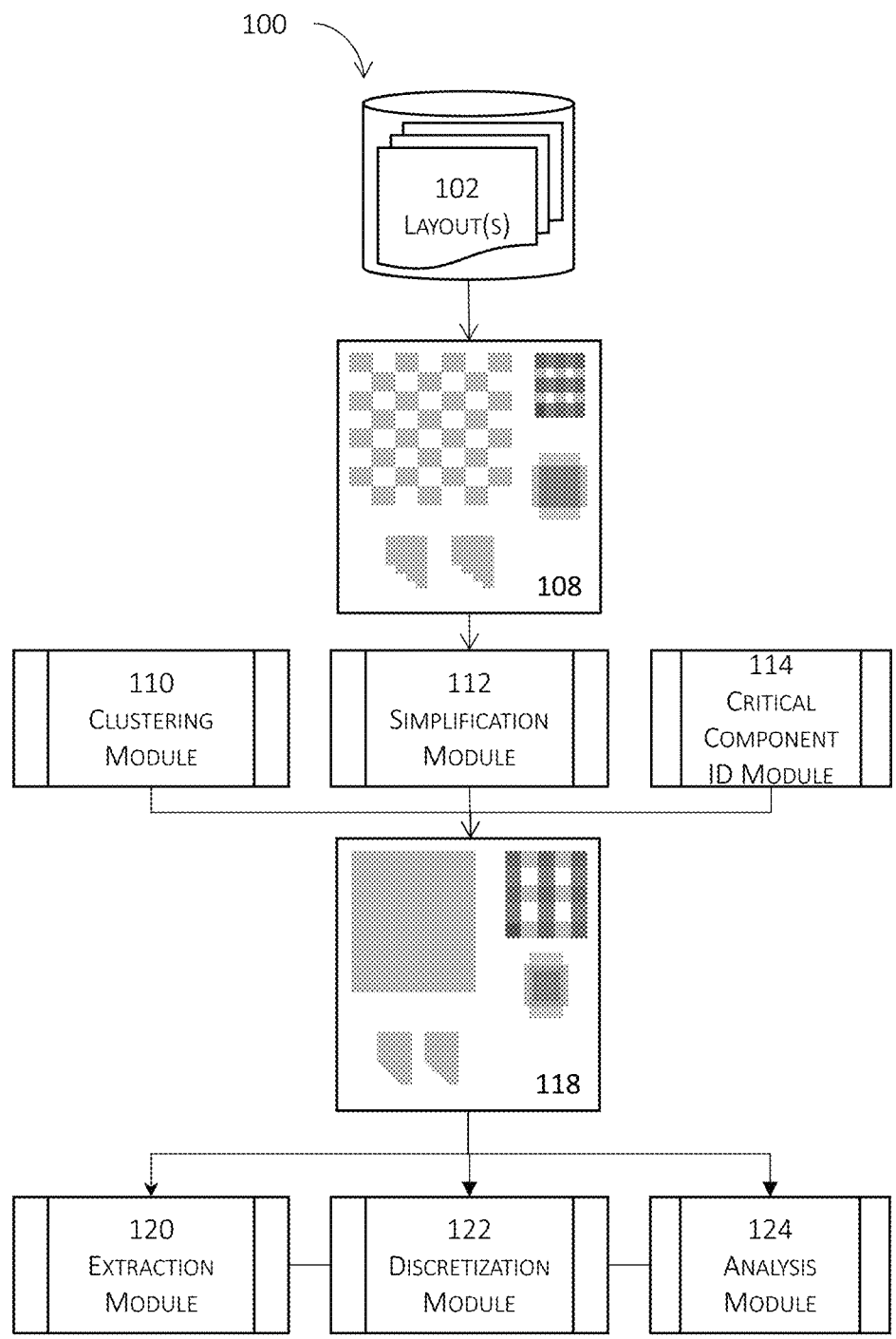
FIG. 1 illustrates a high-level block diagram of a simplified system for characterizing electronic designs with electronic design simplification techniques in one or more embodiments.

FIG. 1 illustrates a high-level block diagram of a simplified system for characterizing electronic designs with electronic design simplification techniques in one or more embodiments. A layout 108 of an electronic design may be provided from, for example, a layout database (not shown) persistently or temporarily stored in a storage device 100 having a plurality of electronic designs 102. This layout may be provided to a clustering module 110 that clusters a group of circuit component designs of one or more types into a single circuit component design. The clustering module 110 also flattens the layer (e.g., metal-1 layer, metal-3 layer, etc.) containing the group of circuit component designs; and the flattening and clustering may be performed in parallel or in series. Flattening a layer promotes all the shapes (e.g., metal shapes, dielectric shapes, etc.) in that layer to the top level so that there will have no additional hierarchies for the shapes in the layer. In some embodiments, the clustering module 110 clusters each layer while flattening the layer in the stack of layers of the layout. In some other embodiments, the clustering module 110 clusters one or more select layers in the stack of layers of the layout. Clustering and flattening multiple layers may be performed in series or in parallel on a plurality of computing nodes.

With the clustered and flattened layer in the layout or multiple clustered and flattened layers, a simplification module (112) may perform one or more simplification processes on the clustered and flattened layer (or layers). For example, a simplification module (112) may merge a plurality of circuit components (e.g., vias, metal fills, dummy fills, etc.) into a single circuit component; or a simplification module (112) may also remove a dangling circuit component (e.g., a metal fill, a dummy fill, etc.) that is not connected to any other circuit components. In addition or in the alternative, a simplification module (112) may simplify the geometries of a circuit component into simplified geometries by, for example, removing a feature that is below a certain size, replacing a feature with more complex geometries with simpler geometries (e.g., replacing a curved feature with a plurality of straight-line features), etc.

In some embodiments where two adjacent layers have been clustered and flattened, a simplification module (112) may optionally perform striping on a plurality of shapes by, for example, increasing and/or decreasing the size(s) and/or spacing value(s) of at least one shape in the plurality of shapes. More details about striping will be described later with reference to FIG. 8. With the striping process performed, a simplification module (112) may further optionally adjust one or more vias in response to the results of striping in some embodiments. More details about adjusting a via in response to the results of striping will also be described later with reference to FIG. 9.

The critical component identification module 114, the clustering module 110, and the simplification module 112 may thus function in conjunction with each other to transform the original layout into a simplified layout 118 having a fewer number of circuit components in the simplified layout and/or simpler geometries for at least one circuit component. This simplified layout 118 may be further provided to an extraction module 120 which extracts connectivity from the simplified layout 118. A discretization module 122 may further process the simplified layout 118 to discretize each shape in the simplified layout 118 into one or more meshes or elements, each having a plurality of nodes. Each of the plurality of nodes represents a node of interest for which electrical behaviors are to be solved by, for example, an analysis module 124.

In some embodiments, a discretization module may further determine a quality index for the meshes or elements based on one or more factors. These one or factors may include, for example, a ratio between the largest mesh(es) and the smallest mesh(es), the interior angles of the meshes or elements, a ratio between the largest interior angle and the smallest interior angle of a mesh or element, etc. For example, a mesh or element having an interior angle larger than a first threshold angle or smaller than a second threshold angle may be identified as an ill-conditioned mesh or element. An ill-conditioned mesh or element may cause numerical instability during subsequent analyses or simulations of the layout and thus result in a deduction in the quality index.

An analysis module 124 may then build a model for the simplified layout with at least the connectivity extracted by an extraction module 120, meshes or elements of discretized shapes, and a set of stimuli (e.g., initial voltage values at one or more nodes at one or more time points, etc.) A model may be three-dimensional (3D) having three-dimensional shapes (e.g., a shape having a length, a width, and a thickness in a three-dimensional space) or 2.5D (or hybrid-3D) having hybrid-3D shapes (e.g., a shape having a length and a width in a two-dimensional space yet corresponding to a thickness value from, for example, a technology file or techfile).

The analysis module 124 may then characterize the model using the Kirchhoff circuit equations to obtain nodal electrical behaviors (e.g., voltages, currents, etc.) at the nodes in the model and further using the Maxwell equation to determine the electromagnetic behaviors of the model that represents the simplified layout in some embodiments. In some other embodiments, an analysis module 124 may combine the Maxwell equation with the Kirchhoff's circuit equations into a single matrix formulation and solve this single matrix formulation to predict electrical behaviors by using, for example, the equation described below with reference to FIG. 11. Depending on whether the model is a 3D model or a hybrid 3D model, an analysis module 124 may solve the model accordingly by performing, for example, one or more static analyses, one or more transient analyses, or any combinations thereof.

Figure 2:
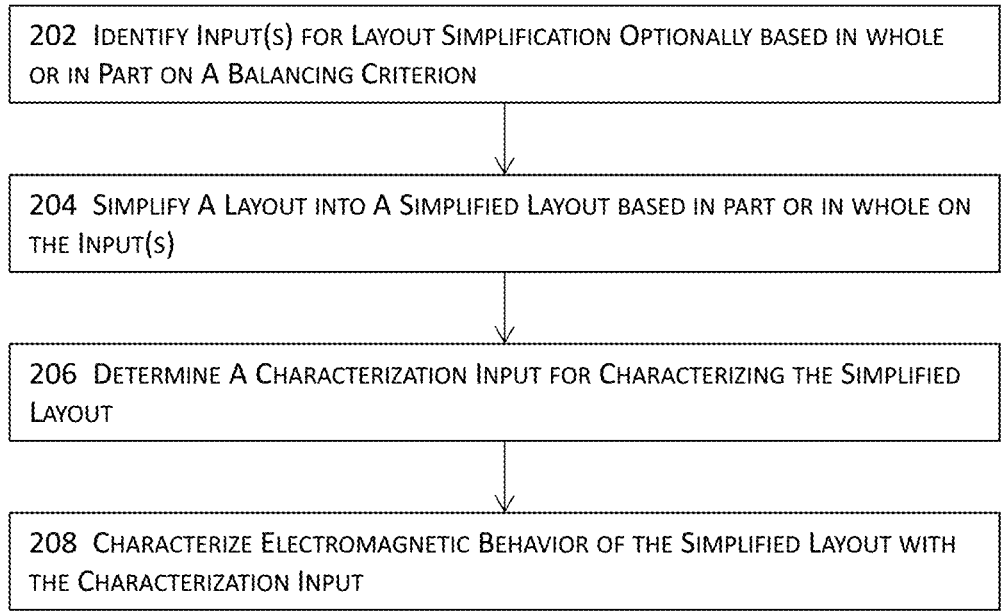
FIG. 2 illustrates a high-level block diagram for characterizing electronic designs with electronic design simplification techniques in one or more embodiments.

FIG. 2 illustrates a high-level block diagram for characterizing electronic designs with electronic design simplification techniques in one or more embodiments. In these embodiments, one or more inputs may be identified at 202 for simplifying an electronic design (e.g., a layout). These one or more inputs may include, for example, automatic identification of one or more critical circuit components. For example, a critical circuit component identification module (e.g., 114) may automatically identify a circuit component as a critical circuit component based in part or in whole upon a performance criterion, a reliability criterion, a manufacturing criterion, and/or any combinations thereof from a technology file, a design specification, etc.

A user may also manually identify a circuit component as a critical circuit component by, for example, selecting the circuit component in a graphical user interface and designate the selected circuit component as a critical circuit component. These one or more inputs may further include a set of initial and/or boundary conditions, a set of stimuli (e.g., a set of electrical signals, etc.), one or more temporal sequences of a stimulus, etc. that may be used as inputs for characterizing the layout.

The layout may be simplified into a simplified layout at 204 based at least in part upon the one or more inputs identified at 202. One or more simplification techniques may be applied to the layout to transform the original layout into a simplified layout. For example, a module (e.g., a clustering module 110) may identify a layer (e.g., metal-1 layer, metal-5 layer, etc.) from the layout and cluster a group of circuit components into a single circuit component.

The circuit components in the group to be clustered may be identical circuit components having the same materials and dimensions in some embodiments or different circuit components having different dimensions. For example, a group of vias of the same size and materials may be clustered into a single via having the same material but different dimensions. As another example, a group of fill shapes (e.g., metal fills, dummy fills, etc.) of the same material with identical or different dimensions may also be clustered into a single shape having the same material but different dimensions.

In some embodiments, the shape of a single circuit component clustered from a group of circuit components may be determined to be the external bounding box of the group of circuit components. In some of these embodiments, a positive (or negative) offset may be added (or subtracted) from one or more sides of the external bounding box. In these embodiments, the total area of the single circuit component will be larger than the sum of the individual areas of the individual circuit components in the group. In some of these embodiments where the single circuit component is determined to be the of the same size as the external bounding box of the group of circuit components, the impact on the cross-coupling capacitance between the single circuit component on one layer and one or more neighboring shapes on the same layer due to the clustering may be reduced or eliminated, although the cross-coupling capacitance between the single circuit component on one layer and a first shape on an adjacent layer may deviate more from the actual cross-coupling capacitance between the original group of circuit components and the first shape due to the changes in the total area of the single circuit component.

In some of these embodiments, one or more openings may be created in the single circuit component to bring the total area of the single circuit component to be identical or close to the sum of the individual areas of the individual circuit components so that the impact on the cross-coupling capacitance between the single circuit component in one layer and another shape in a neighboring layer may be reduced or eliminated. It shall be noted that although these one or more openings are artificially created, the impact on the electromagnetic behaviors resulting from these openings may also be compensated for by an analysis engine that may artificially introduce an artificial metal plane covering these one or more openings and providing return current path(s).

In some embodiments, the single circuit component may be sized to have identical to or sufficiently close to the sum of the areas of individual circuit components. In these embodiments, the cross-coupling capacitance between the single circuit component on a layer and a first shape on another layer may be more correctly represented by this single circuit component, although the cross-coupling capacitance between the single circuit component on the layer and a neighboring shape on the same layer may deviate more because the spacing between the edges of the single circuit component and those of the neighboring shape is more likely to change.

In some embodiments, a simplification process may remove a dangling circuit component from the layout. A dangling circuit component is a circuit component that is not electrically connected to another circuit component. Some examples of dangling circuit components may include a metal fill shape, a dummy fill shape, etc. Another simplification process may be optionally performed on the layout to simplify more complex geometries of a shape into simpler geometries. For example, a feature of a size smaller than a threshold value may be removed; a curved feature may be replaced with one or more straight features; etc.

In some embodiments where more than one layer has been clustered and flattened, striping may be performed to increase and/or decrease the sizes of and/or spacing values between shapes on two or more layers; and the size and/or location of a via between the two or more layers may also be adjusted to satisfy one or more design rules (e.g., a via enclosure rule) and/or one or more analysis criteria (e.g., a discretization criterion that requires a margin of at least a threshold size between the edge of the via and the edge of the interconnect for which the via is created). More details about striping and via adjustment are described below with reference to FIGS. 8-9.

Once one or more simplification processes have been applied to transform the original layout into a simplified layout, the simplified may be provided to a discretization module that discretizes each shape in the simplified layout into one or more meshes or elements. A characterization input may be determined at 206 for characterizing the simplified layout. A characterization input may include, for example, a set of initial and/or boundary conditions, a set of stimuli (e.g., a set of electrical signals, etc.), one or more temporal sequences of a stimulus, etc. A model may be constructed using at least the meshes or elements generated by discretization and the characterization input.

The electromagnetic behaviors of the model may then be characterized at 208. For example, the simplified layout may be analyzed with respect to the Kirchhoff's circuit equations to obtain the nodal solutions (e.g., voltages and/or currents, etc.) at a plurality of nodes in the simplified layout; and the nodal solutions may further be used in one or more analyses based on the Maxwell equation to determine the electromagnetic behaviors in some embodiments. In some other embodiments, an analysis module combines the Maxwell equation for the model with the Kirchhoff's circuit equations into a single matrix formulation and solve this single matrix formulation to determine predicted electrical behaviors by using, for example, the equation described below with reference to FIG. 11.

Figure 3A:
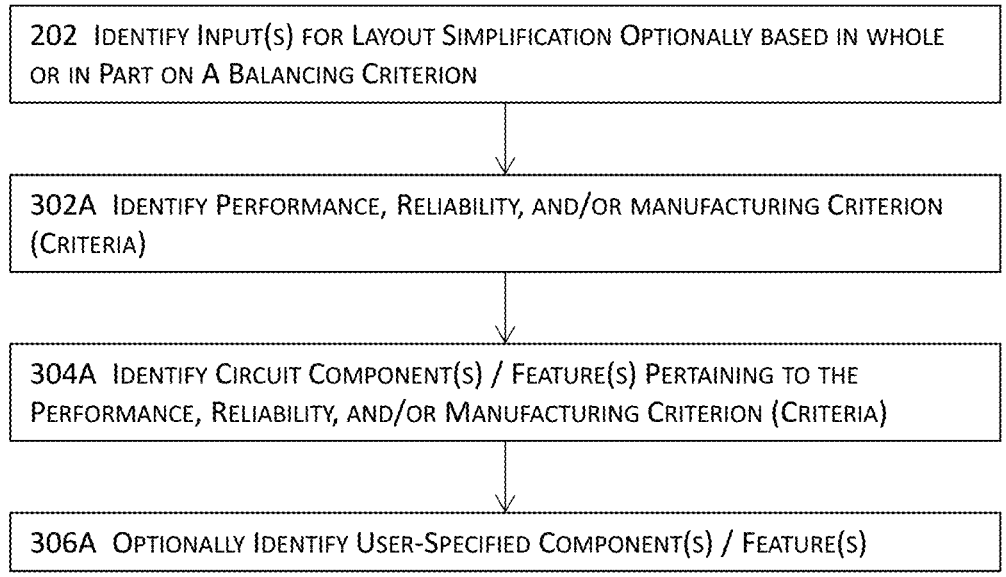
FIGS. 3A-3B illustrate more details about a portion of the high-level block diagram illustrated in FIG. 2 in one or more embodiments.
Figure 3B:
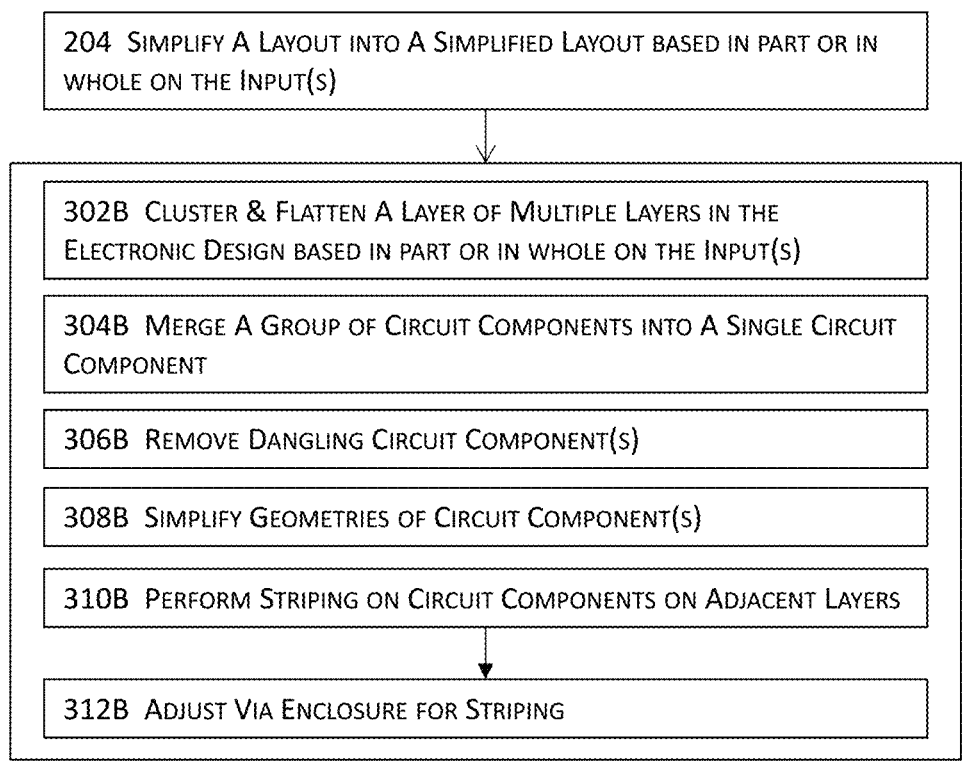

FIGS. 3A-3B illustrate more details about a portion of the high-level block diagram illustrated in FIG. 2 in one or more embodiments. More particularly, FIG. 3A illustrates more details about identifying one or more inputs (202) of FIG. 2 in some embodiments. In these embodiments, one or more criteria may be identified at 302A; and these one or more criteria include, for example, one or more performance criteria, one or more reliability criteria, one or more manufacturing criteria, or any combinations thereof. As described above with reference to FIG. 2, a simplification module (e.g., 112 of FIG. 1) may account for these one or more identified inputs during the performance of a simplification process on an electronic design of interest. In some embodiments, a simplification module may determine whether a circuit component is not to be subject to simplification based in part or in whole upon such an input.

For example, an input may indicate that a circuit component in a high-performance circuitry or in a portion of the electronic design where the performance specification is relatively tighter (e.g., having a smaller permissible tolerance) so that significant deviations in the circuit component's dimensions and/or location may cause the circuit component to fail to comply with the specification. In this example, a simplification module may designate the circuit component based on the input as a circuit component that is not subject to one or more simplification processes described above. In some of these embodiments, a simplification module may designate the circuit component as one that is subject to limited simplifications (e.g., a modification that has a relatively low threshold for changes), rather than precluding this circuit component from all simplification processes. For example, a first via having a circular cross-section along a high-frequency signal line may be approximated with more straight-line segments (e.g., with six or eight straight-line segments), whereas a second via having a circular cross-section along a power line may be approximated with fewer straight-line segments (e.g., approximated with four or even three straight-line segments).

Other inputs pertaining to manufacturing and/or reliability requirements may also be identified at 302A; and a simplification module may similarly designate circuit components according to such inputs. For example, a circuit component having a tighter manufacturing requirement or criterion may be designated as such based on such an input so that this circuit component may be subject to less or even no simplification in a substantially similar manner as described above with respect to a performance criterion.

In addition or in the alternative, a module described herein (e.g., a clustering module, a simplification module, etc.) may automatically identify an input for a layout and use at least the input to control the subsequent clustering and/or simplification. For example, a bundle of adjacent interconnects of one or more lengths on a layer may be clustered into a single circuit component or into multiple circuit components. These interconnects may be connected to different destinations having different significance. Unless otherwise controlled, a clustering module may simply cluster the bundle of adjacent interconnects into a single circuit component so that the simplified layout may not provide sufficient resolution for the respective behaviors pertaining to these different destinations. In some embodiments, a module (e.g., a critical component identification module 114) may detect such significance based in part or in whole upon, for example, the design specification, the schematics, etc. of the layout and automatically divide the bundle of adjacent interconnects into appropriate sub-groups so as to better capture the electromagnetic behaviors due to the different significance of the different destinations.

With an input pertaining to one or more performance, reliability, and/or manufacturing criteria identified at 302A, a circuit component or a circuit feature thereof may be identified at 304A based in part or in whole upon the input. This circuit component or circuit feature thereof may be subsequently processed or ignored by, for example, a clustering module and/or a simplification module. In an example where an input indicates that a first circuit component corresponds to a more critical portion of the electronic design, a clustering module and/or a simplification module may exclude this first circuit component from simplification or apply less aggressive simplification to this first circuit component. Furthermore, for a second circuit component that corresponds to another input that indicates the second circuit component as non-critical, or that does not correspond to any input indicative of the criticality of the second circuit component, a clustering module and/or a simplification module may apply more aggressive clustering or simplification to the second circuit component.

Optionally, a user may manually designate a circuit component in, for example, a user interface at 306A so that the circuit component is not subject to any clustering and/or simplification or is subject to less aggressive clustering and/or simplification. For example, a user may click on a specific circuit component in a layout or select the circuit component from a list of circuit component in the layout and choose which level of clustering and/or simplification (e.g., none, conservative, medium, aggressive, etc.) may be applied to this specific circuit component.

FIG. 3B illustrates more details about simplification of a layout in some embodiments. In these illustrated embodiments, a clustering module may cluster a group of circuit components in a layer (e.g., metal-3 layer, metal-7 layer, etc.) of a layout at 302B while flattening the layer by promoting all the circuit components in the layer to the same hierarchy. A clustering module may cluster a group of circuit components based on one or more criteria. For example, a clustering module may cluster a group of circuit components having sizes that are equal to or smaller than a threshold size and/or having spacing values that are equal to or smaller than a threshold spacing value. Once the group of circuit components has been clustered, a simplification module may merge the group of circuit components into a single shape at 304B by using, for example, the process described above with reference to FIG. 2. In the example illustrated in FIG. 7, a plurality of circuit components 704 (e.g., vias, metal fills, dummy fills, etc.) is clustered into a single circuit component 708.

A simplification module may optionally remove, at 306B, a dangling circuit component that is not electrically connected to any other circuit components. A dangling circuit component is less likely to affect the nodal solutions obtained from the Kirchhoff's circuit equations because a dangling circuit component is not electrically connected to other circuit components. In some embodiments, a simplification module may remove a dangling circuit component from the layout for a subsequent analysis to obtain the nodal solutions (e.g., voltages, currents, etc.) of the electronic design under the Kirchhoff's circuit equations, but the simplification module may nevertheless retain the dangling circuit component in another subsequent analysis under the Maxwell equation to more accurately capture the electromagnetic behaviors resulting from the dangling circuit component. In some other embodiments, the dangling circuit component may be removed from the layout for the models for both the Kirchhoff's circuit equations and the Maxwell equation.

Figure 10:
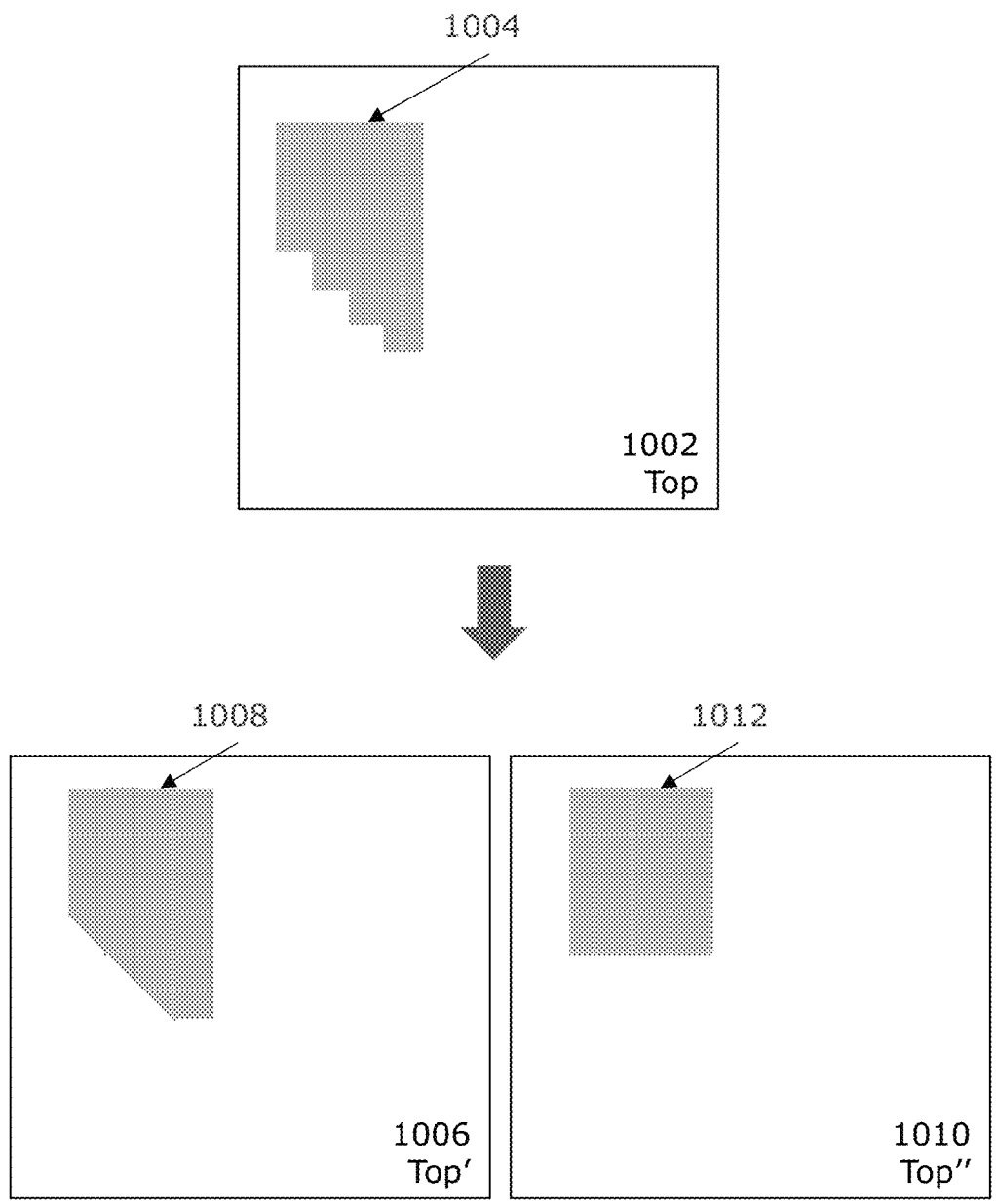
FIG. 10 illustrates a simplified example of the application of another technique for characterizing electronic designs with electronic design simplification techniques in one or more embodiments.

In some embodiments, a simplification module may simplify more complex geometries of a circuit component into simpler geometries at 308B based in whole or in part upon the one or more inputs identified at 202. Geometry simplification may, for example, replace a more complex geometry with a simpler geometry, approximate a curved feature with straight-line segments, increase a dimension or a size of a circuit component, decrease one or more dimensions or a size of a circuit component, etc. Geometry simplification may also be applied to a circuit component or a circuit feature thereof in different levels of aggressiveness based in part or in whole upon, for example, an input identified at 202 and pertaining to the circuit component or the circuit feature thereof. An example of the application of the simplification technique with different levels of aggressiveness is illustrated in FIG. 10 and described below.

In some embodiments where more than one layer in an electronic design has been clustered and flattened, a simplification module may perform striping at 310B. In some embodiments, striping enables a user to increase and/or decrease a dimension pertaining to a circuit component. For example, a user may increase (or decrease) the width of an interconnect while decreasing (or increasing) the spacing value between the interconnect and an adjacent interconnect by specifying a desired value or simply by dragging an edge of an interconnect or moving an interconnect.

The simplification module functions in conjunction with an EDA (electronic design automation) suite and automatically modifies the layout to reflect the changes specified by the user, while ensuring that the modified layout complies with pertinent design rules. In the example illustrated in FIG. 8, a user may move interconnects 816 and 818 to accommodate a larger spacing value by, for example, dragging interconnects 816 and 818 to new positions in a layout window. The simplification module functioning in conjunction with a layout editor then determines the legal positions for interconnects 816 and 818 by using the locations specified by the user as the approximate locations so that the modified electronic design 802 may be forwarded to a modeling module to construct or update a model for further design tasks including, for example, electromagnetic analyses, functional and/or physical verification, optimization, etc.

Striping enables a user to experiment with different combinations of dimensions and/or locations of one or more circuit components and is rendered possible by the extremely high efficiency and speed of the present invention. In a benchmark testing using an example real-world electronic design with more than eight (8) millions of shapes, the present invention reduces the original electronic design to a simplified electronic design with fewer than 200,000 shapes and simpler geometries in less than two seconds on a computing system, as opposed to over seven days on the same computing system with conventional approaches.

With striping that may change the dimension(s), size, and/or location of a circuit component (e.g., a shape), one or more dimension(s), size, and/or location of another circuit component (e.g., a shape) may need be adjusted at 312B to accommodate the changes from striping. For example, in some embodiments where the circuit component modified by striping includes an interconnect on a layer, a via that connects the interconnect to another interconnect on an adjacent layer may be adjusted (e.g., the location, size, and/or one or more dimensions of the via) at 312B. In the example illustrated in FIG. 8 where striping is performed to respectively modify the original, first set of interconnects (814, 816, and 818) and the original, second set of interconnects (820, 822, and 824) into the modified first set (826, 828, and 830) and the modified second set (804, 806, and 808).

Furthermore, striping may alter the arrangement of a set of original circuit components but may or may not change the bounding box of the set of original circuit components to which striping is applied. For example, a set of original circuit components may include ten shapes with 10 nm width spaced apart at 10 nm from each other. The width of the bounding box of this set is 190 nm. Striping may nevertheless modify this set of circuit components to have five shapes with 10 nm width that are spaced apart at 25 nm from each other. In this modified set of circuit components, the width of the bounding box remains at 190 nm, but this modified set now contains a simpler layout structure. It shall be noted that the width values and spacing values in the aforementioned example are merely examples, and that other different combinations of width values and spacing values may also be accommodated by striping.

The dimension(s), size, and/or location of the original via 832 connecting interconnect 814 and interconnect 824 may need to be adjusted to accommodate the striping in order to maintain connectivity. The adjustment may be made to transform via 832 into via 834 based on one or more criteria. For example, the dimension(s), size, and/or location of via 834 may be determined in such a way to satisfy one or more pertinent design rules (e.g., a via enclosure rule) so that the placement of via 834 is legal. In addition or in the alternative, the dimension(s), size, and/or location of via 834 may also be determined based in part or in whole upon the geometries of the corresponding interconnects connected by via 834.

For example, if via 834 is sized and/or positioned such that one edge of via 834 is aligned with or has a small offset (e.g., an offset smaller than a threshold distance that may be determined based on other feature sizes in the electronic design) from a corresponding edge of an interconnect, this edge of via 834 may pose difficulties to a discretization module that will be forced to use small meshes or elements to discretize the area between these two corresponding edges. This use of small meshes or elements increases the overall number of meshes in the eventual model for the layout and results in a larger matrix formulation that requires more computing resources in the form of, for example, larger memory footprint to accommodate the larger matrix formulation and more processor cycles to solve the larger matrix formulation.

In some embodiments, even the dimension(s), size, and/or location of the via 832 in the original electronic design 812 "Top1" may need to be adjusted. For example, the original via 832 may be inserted in such a way that one or more edges of the via 832 are aligned with the one or more corresponding edges of interconnect 814 and/or interconnect 824 or are offset from the one or more corresponding edges of interconnect 814 and/or interconnect 824 with a small margin to satisfy, for example, a via enclosure rule. As described herein, such a small margin or no margin at all may pose difficulties to a discretization module which is forced to use small meshes or elements to model such a small margin. In this example, the dimension(s) and/or size of via 832 may be adjusted. For example, via 832 may be shrunk in one or both dimensions to enlarge the distance between an edge of via 832 to the corresponding edge of an interconnect (e.g., 814 or 824).

Figure 4:
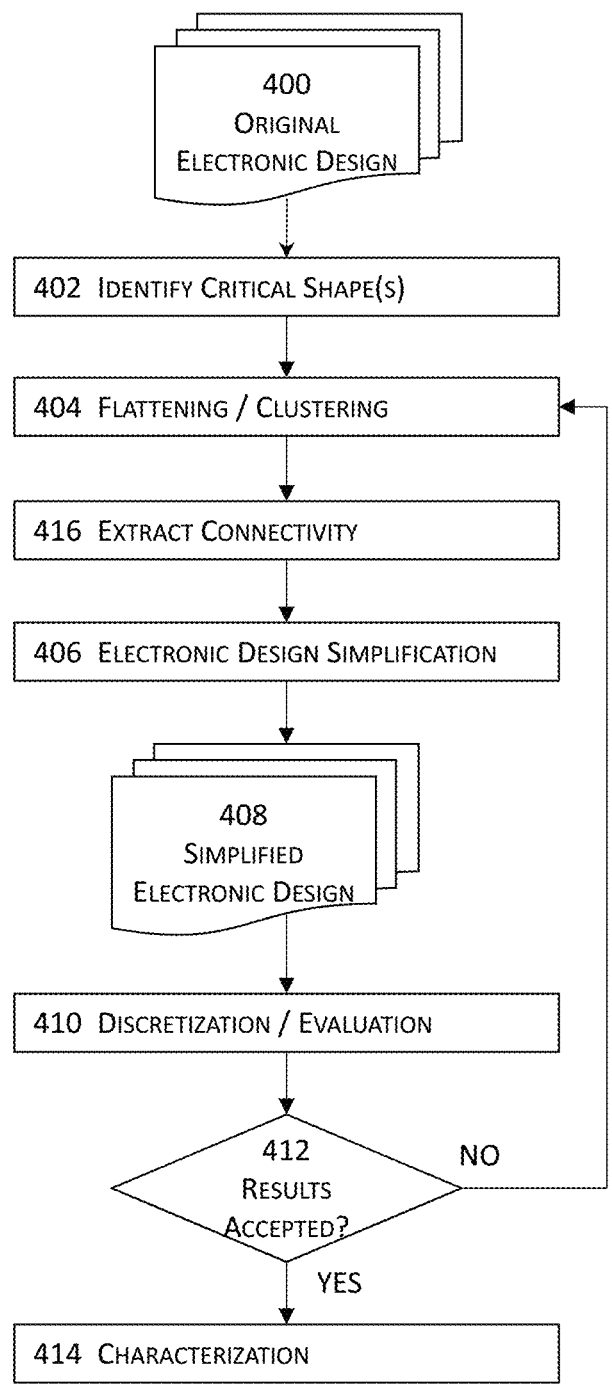
FIG. 4 illustrates a more detailed flow diagram of a process for characterizing electronic designs with electronic design simplification techniques in one or more embodiments.

FIG. 4 illustrates a more detailed flow diagram of a process for characterizing electronic designs with electronic design simplification techniques in one or more embodiments. In some embodiments, an original electronic design is identified (400 in FIG. 4). Circuit component clustering may be first performed for the electronic design. Circuit component clustering aggregate certain circuit components of certain types having sizes below or equal to a threshold size into a single aggregated circuit component. For example, vias, which often appear in groups in an electronic design due to the nature of electronic designs. As another example, metal fills such as dummy metal fills may also appear in groups. A group of circuit components may thus be aggregated into a single aggregated circuit component in such a way that exhibits no or limited impact on the electrical characteristics. For example, a group of vias may be clustered into a single metal shape having one or more openings.

The clustering may be performed in many different manners based in part or in whole upon a balancing scale between the accuracy of resulting electrical behavior(s) of the aggregated circuit component and the computation resources needed to perform aggregation and/or subsequent processing of the aggregated circuit component (e.g., meshing or discretizing the aggregated circuit component, modeling the aggregated circuit component, analyses performed on the model of the electronic design having the aggregated circuit component, etc.)

In some embodiments, the area and/or locations of the one or more openings may be configured (e.g., through automatic configuration or user configuration) based in part or in whole upon one or more criteria. These one or more criteria include, for example, a balanced consideration between the accuracy of resulting electrical behavior(s) of the aggregated circuit component and the computation resources needed or budgeted to perform aggregation and/or subsequent processing of the aggregated circuit component.

For example, clustering a group of vias may be performed to generate a single, aggregated metal shape for the group of vias, where the aggregated metal shape has an external boundary as the bounding box of the group of vias with an optional positive or negative offset. In this example, the total area of the aggregated metal shape will be larger than the sum of the areas of individual vias. In some of these embodiments, the aggregated metal shape for the group of vias may be configured to have one or more openings so that the area of the aggregated metal shape is identical to or sufficiently close to the sum of individual areas of the individual vias. It shall be noted that the techniques described herein are not limited to conductors (e.g., vias, metal fills, etc.) Rather, these techniques may also be applied to circuit components of insulators.

The locations of these one or more openings may also be configured (automatically by the software tool and/or manually entered by a user) to avoid or reduce any shift or change in the predicted, electrical behavior of the electronic design (e.g., predicted or simulated electrical behavior of the electronic design or a portion thereof) due to clustering the group of circuit components. In some embodiments, these one or more openings may be placed in a calculated way or in an arbitrary way because the analysis engine described herein may compensate for or even eliminate the possible shift or change in the electrical behaviors.

For example, the modeling tool described herein may, in some embodiments, insert one or more artificial, floating planes that cover the one or more openings or even the entire electronic design for subsequent EM analyses to provide continuity path(s) for possible disconnected field domains that should have been disconnected. In some other embodiments, the modeling tool described herein may individually, selectively cover these one or more with one or more respective artificial, floating metal shapes to provide continuity path(s) with a margin of overhang while avoiding inadvertently connecting domains that should have been disconnected.

It shall be noted that the techniques described herein may be applied with full and equal effects for flat and hierarchical electronic designs. That is, an electronic design may be flat (e.g., having only one level in the entire electronic design)

in some embodiments, whereas another electronic design may be hierarchical with a plurality of hierarchical levels (or hierarchies). In some embodiments where the electronic design of interest is hierarchical with multiple layers (e.g., metal 1, metal 2, etc.), each layer in the electronic design may be separately processed. For example, a layer in the electronic design may be first identified and flattened by promoting all the shapes to the highest hierarchy in the layer. Clustering may then be performed on the flattened layer in an identical or substantially similar manner. A next layer of interest may be identified and proceed through an identical or substantially similar process. It shall be noted that flattening and clustering of multiple layers of an electronic design may be performed in a parallel or distributed manner by leveraging multiple processors and/or threads of execution to further expedite the performance of flattening and clustering.

Figure 5:
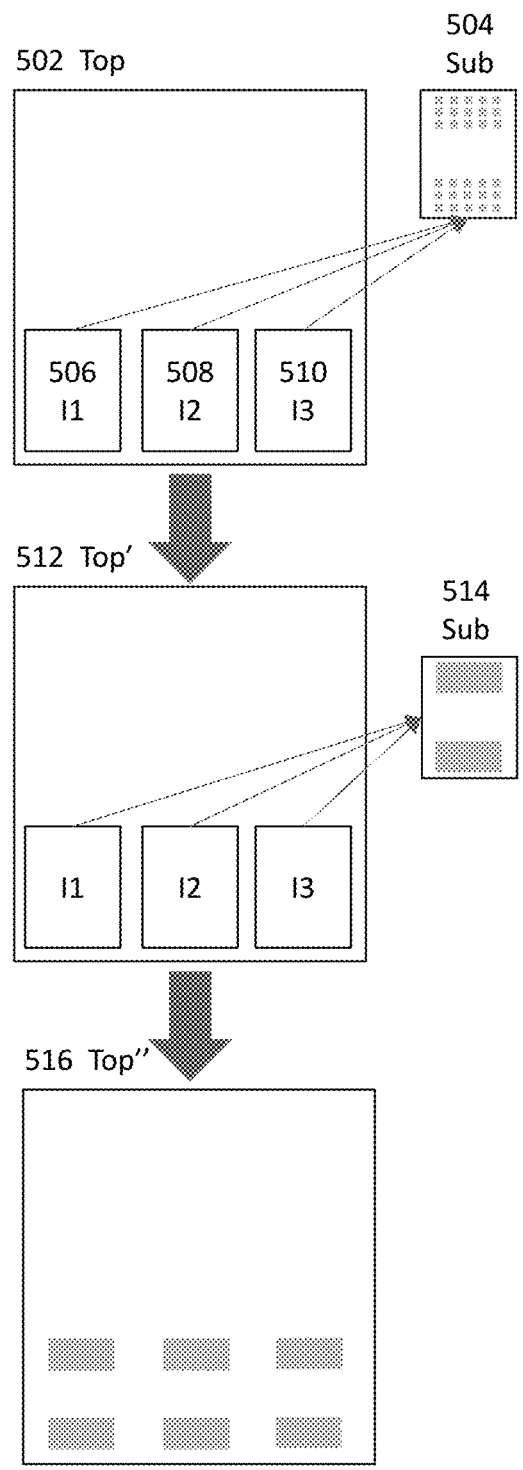
FIG. 5 illustrates a simplified example of the application of a simplification technique for characterizing electronic designs with electronic design simplification techniques in one or more embodiments.

In the example illustrated in FIG. 5, a "Top" layer 502 located in a hierarchical level (or a flat electronic design having a single level) includes three instances (506 "I1", 508 "I2", and 510 "I3") of a master cell 504 "Sub" having more details as illustrated in FIG. 5. Unlike conventional flatten processes that promote the more detailed circuit components to the "top" hierarchical level 502, the flattening process examines the size(s) and/or spacing value(s) of these more detailed circuit components in one of the instances and determines that these more detailed circuit components may be clustered to form a single, aggregated circuit component for these three instances of the same master cell.

The flattening process or the clustering process, which may be invoked by the flattening process via an IPC or inter-process call, may then cluster these more detailed circuit components to generate a modified cell 514 "Sub" or to generate three modified instances in the modified layer 512 "Top". The flattening process may then promote these three single, aggregated circuit components (one for each instance shown) to the hierarchical level to arrive at the modified layer 516 "Top'" In these embodiments, the flattening process described herein distinguishes from conventional flattening processes in that the flatten process described herein may also cluster a plurality of circuit component designs into a single circuit component based at least in part upon, for example, the size(s), type(s), and/or spacing value(s) of the plurality of circuit component designs.

It shall be further noted that one or more critical circuit components may be identified at 402 to preserve the physical and electrical characteristics of these one or more critical circuit components. A critical circuit component may be automatically identified by the techniques based at least in part upon, for example, the performance requirement(s), the reliability requirement(s), the manufacturing requirement(s), and/or operating characteristics, etc. pertaining the circuit component in some embodiments. In some embodiments, a user may identify and designate a circuit component as a critical circuit component. Once a critical circuit component is identified, these techniques will preserve the physical and/or electrical characteristics of this critical circuit component.

Preserving physical and/or electrical characteristics of a critical circuit component does not necessarily mean that these physical or electrical characteristics of this critical circuit component may not be altered. Rather, these techniques will try to avoid or reduce changes or the extents of changes to this critical circuit component. For example, an OPC (optical proximity correction) feature may exhibit some small geometries (e.g., a small step along a straight edge, a curved edge having a radius that is relatively small than certain other geometries, etc.) that may cause issues with subsequent discretization and/or analyses of this OPC feature. In some embodiments, the techniques described herein may optionally predict or assess the possible impact of eliminating these small geometries and/or remove or blend the small geometries with the remaining geometric features based optionally upon the predicted or assessed impact.

Once the electronic design of interest is flattened and clustered at 404, the electronic design may first undergo connectivity extraction at 416 prior to proceeding through a series of simplification processes at 406 to generate a simplified electronic design 408. The simplified electronic design 408 may then be discretized; and the discretization results may be checked or evaluated to determine whether the discretization results are satisfactory at 412.

For example, the meshes or elements generated by the discretization process may be checked to determine whether the total number of elements is acceptable, whether the elements (or meshes) may cause numerical instability (e.g., elements having an internal angle larger than a first threshold value or smaller than a second threshold value, etc.), the ratio of the largest element area to the smallest element area, etc. If the evaluation results are not satisfactory the process may return to 404 and repeat 404 through 412 until the evaluation results are determined to be satisfactory at 412. Once the evaluation results are determined to be satisfactory at 412, the process may proceed to perform one or more analyses (e.g., EM or electromagnetic simulation) with the simplified electronic design at 414.

Figure 6:
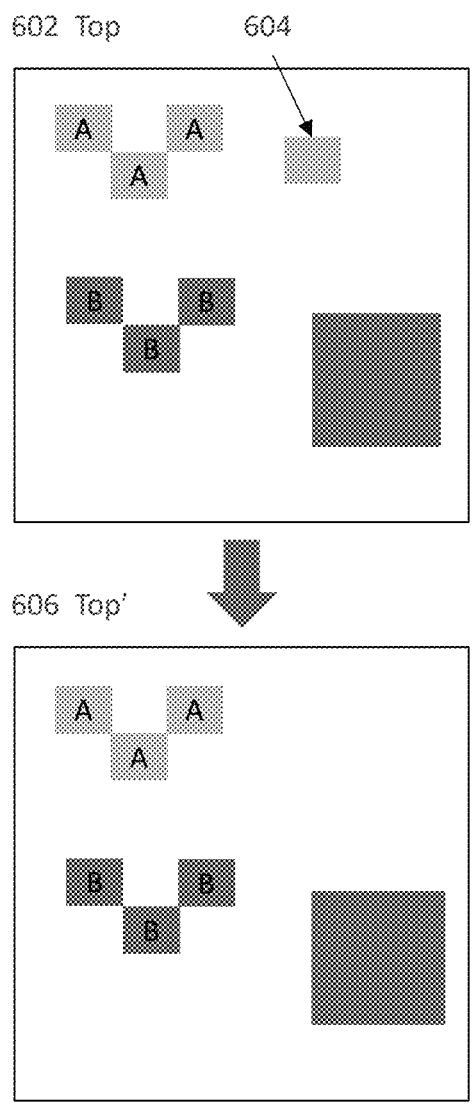
FIG. 6 illustrates a simplified example of the application of another simplification technique for characterizing electronic designs with electronic design simplification techniques in one or more embodiments.

The series of simplification processes may include, for example, removal of a circuit component. In the example illustrated in FIG. 6, the simplification process described herein may examine the electronic design and determines that the dangling circuit component 604 on a layer 602 "Top" or a portion thereof is not connected to any other circuit components and may thus be removed so that the layer 602 may be modified into a modified layer 606 "Top'". A dangling circuit component may not necessarily be removed all the time. For example, a dangling circuit component may nevertheless be kept in the electronic design if it is determined that the size, type, and/or geometric characteristics of the dangling circuit component may exhibit non-negligible electrical effects (e.g., cross-coupling capacitance, inductance, etc.)

Figure 7:
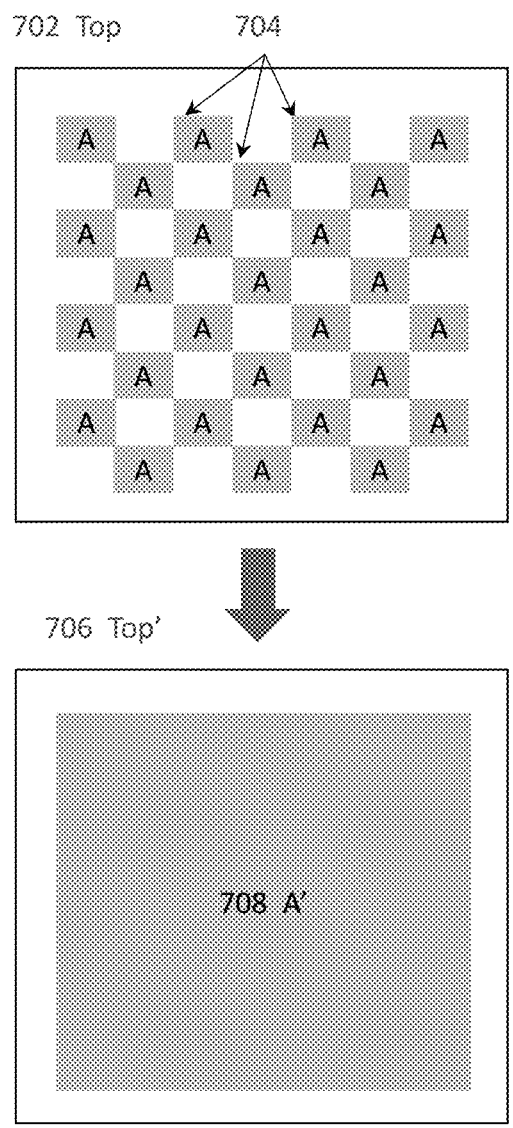
FIG. 7 illustrates a simplified example of the application of another simplification technique for characterizing electronic designs with electronic design simplification techniques in one or more embodiments.

In some embodiments, the simplification process may merge multiple circuit components into a single circuit component. In the example illustrated in FIG. 7, the original electronic design 702 "Top" layer may include a plurality of circuit components 704. The simplification process described herein may determine that the plurality of circuit components "A" may be merged into a single circuit component 708 "A" based at least in part upon, for example, the size(s), type(s), spacing value(s), and/or surrounding circuit component(s) within a range of influence, etc. For example, the simplification process or engine may determine that the plurality of circuit components is of certain sizes at certain spacing values, and that these sizes and/or spacing values may pose difficulties in discretization and subsequent analyses. The simplification process may further determine that these sizes and spacing values are below their respective threshold values and then merge the plurality of circuit components 704 into the single, merged shape 708 as shown in FIG. 7. A modified electronic design 706 "Top" may thus be generated as shown in FIG. 7. It shall be noted that the plurality of circuit components "A" illustrated in FIG. 7 are identical circuit components, but different circuit components may also be merged in some embodiments.

In the example illustrated in FIG. 7, the single circuit component 708 "A" may be determined as the rectangular bounding box enclosing the outermost boundary of the plurality of circuit components 704. In this example, the spacing from the edges of the plurality of circuit components to neighboring circuit components may be better maintained to more correctly capture electrical parasitics (e.g., cross-coupling capacitance) in the same layer although the coupling capacitance between the single circuit component 708 "A" and another circuit component in an immediately neighboring layer may deviate more.

The simplification process described herein allows a set of shapes of the same materials may be merged into a single shape of a determined size and shape. Shape merger may be performed in many different manners that exhibit different degrees of impact on the resulting electrical characteristics or behaviors of the single shape. For example, the single circuit component 708 "A" may be determined as a rectangular shape having the same area as the sum of individual areas of the plurality of circuit components 704. In these embodiments, the electrical parasitics (e.g., coupling capacitance) between the single circuit component 708 "A" and another circuit component in an immediately neighboring layer may be more correctly captured, but the electrical parasitics (e.g., in-layer cross coupling capacitance, inductance, return current path, etc.) may deviate more.

In some embodiments, the simplification process may further determine that the merged circuit component 708 "A" may exhibit non-negligible effects on the electrical behaviors and/or electrical characteristics of the electronic design or a portion thereof. In these embodiments, the simplification may further modify the merged single circuit component by creating one or more openings in the single, merged circuit component 708 and modifies the electronic as shown in 706 "Top". It shall be noted that the size and shape of the openings may not necessarily be uniform in a merged circuit component or from one circuit component to another circuit component.

Moreover, the size of an opening in a merged circuit component may be determined in such a way that the total area of the merged circuit component having these one or more openings is identical to or sufficiently close (e.g., within a threshold tolerance such as 1%, 5%, or any empirical or physics-based threshold values, etc.) to the sum of individual circuit components in the original electronic design in some embodiments. In some embodiments, the location of an opening may be determined by using, for example, empirical rules, physics-based rules, heuristics, and/or historical data so that the resulting merged circuit component exhibits more accurate electrical characteristics or behaviors. Because the determination of the sizes and locations of openings consume computational resources, the creation of openings may be further controlled by a balancing criterion between the accuracy requirement and the computational resource requirement.

Figure 8:
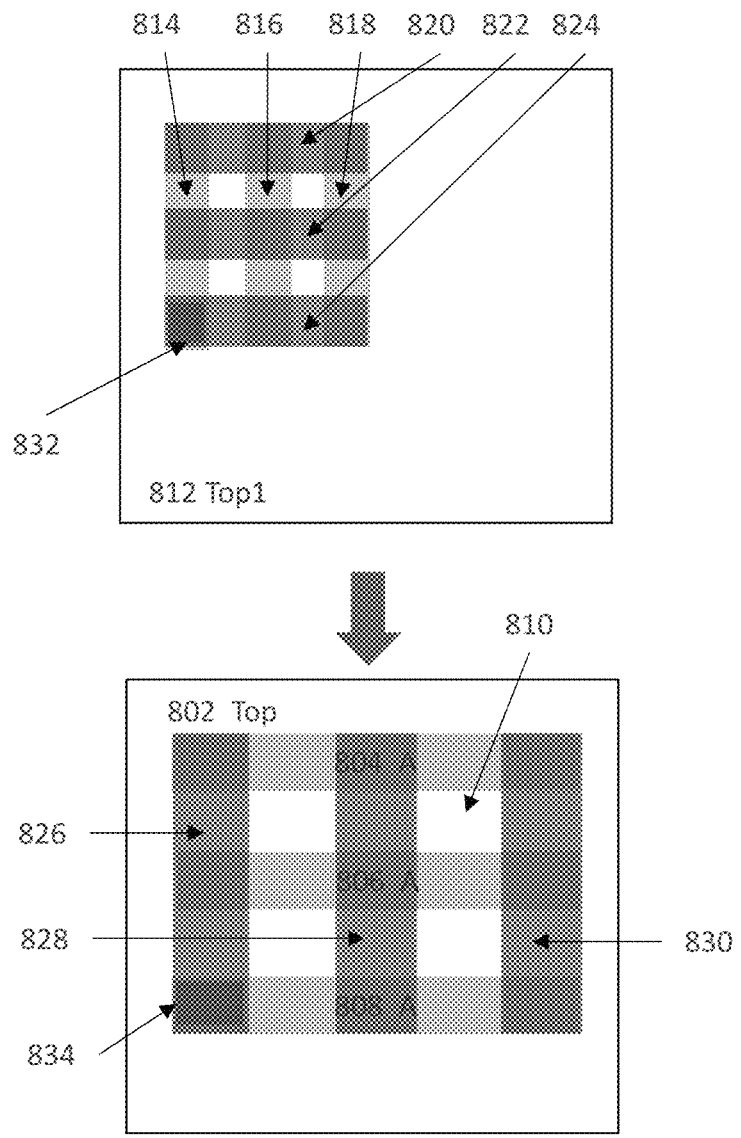
FIG. 8 illustrates a simplified example of the application of another technique for characterizing electronic designs with electronic design simplification techniques across multiple layers in an electronic design in one or more embodiments.

FIG. 8 further illustrates another example of shape striping in some embodiments. In some embodiments, a flattened electronic design 812 "Top1" may include a first set of shapes 814, 816, and 818 in the vertical direction from a first layer and a second set of shapes 820, 822, and 824 in the horizontal direction from an adjacent, second layer. It shall be noted that in this example, the first layer and the second layer permit shapes to be placed or routed in only one respective direction (e.g., the horizontal direction for one layer and the vertical direction for the other layer in FIG. 8).

These shapes in the first set have a first width (or first widths as the shapes may or may not have the same width) at a first spacing value (or first spacing values as these shapes may or may not have the same spacing value); and these shapes in the second set have a second width (or second widths as the shapes may or may not have the same width) at a second spacing value (or second spacing values as these shapes may or may not have the same spacing value).

The simplification process may determine that these widths and/or spacing values may pose difficulties (e.g., numerical instability, a large number of meshes or elements that consumes more computational resources, a large ratio beyond a threshold value between the area of the largest mesh or element and the area of an element for the geometries represented by the first and/or second set of shapes, etc.) for a discretization and/or an analysis module. For example, in order to better resolve a relatively small shape (as compared to other circuit features having relatively large size), a discretizing module needs to use even smaller meshes or elements to represent this relatively shape (e.g., 814, 816, 818, 820, 822, or 824). As a result, as the number of such relatively small circuit features increases, the total number of elements and hence the size of the model representing the electronic design increases, and the matrices corresponding to the nodes of each mesh or element increases. Such increases may prohibitively drag down or even stall the performance of even a modern, state-of-the-art computing system during simulation.

In addition or in the alternative, the simplification process may also provide the options to a designer to modify the width(s) and/or spacing value(s) for these shapes while automatically ensuring that the modified electronic design complies with governing design rules to enable the designer to numerically experiment with different configurations due to the extremely high efficiency and short runtime provided by the present invention. For example, a user (e.g., via a message provided by a module described herein or on the user's own initiative) may notice that the dense "meshes" formed by the shapes across the two adjacent layers may pose difficulties and determines to widen one or more shapes and/or one or more spacing values.

The larger width value and/or the larger spacing values may be specified by a user and subject to correction or modification by, for example, the simplification module in some embodiments. The simplification process may then modify the widths and/or the spacing values of the first and second sets of shapes in 812 to generate the modified electronic design in 802.

Figure 9:
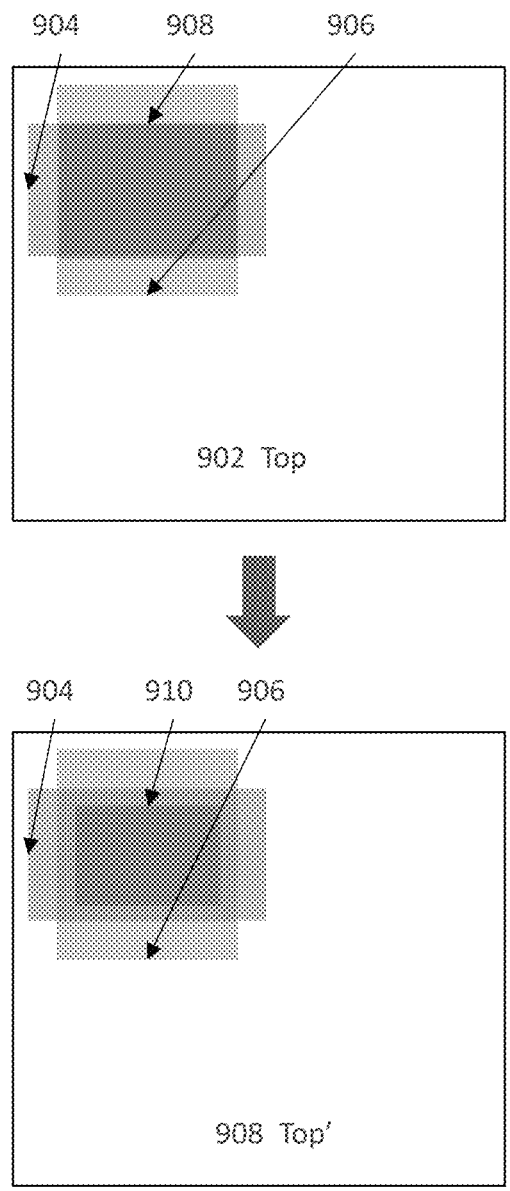
FIG. 9 illustrates a simplified example of the application of another technique for characterizing electronic designs with electronic design simplification techniques in one or more embodiments.

The example illustrated in FIG. 9 describes via enclosure rule in some embodiments. In these embodiments, the simplification process not only simplifies an electronic design but also reduce the total number of design rule violations. Many IC (integrated circuit) design methodologies include via enclosure rules to ensure that both the landing metal and the covering metal enclose the via by a certain amount. Such enclosure rules (also known as via enclosure rules) ensure that a metal layer overlaps a via with a certain amount of extra metal in order to ensure that the via provides a good connection between the two metal layers.

Polysilicon and metal layers may apply different via enclosure rules based at least in part on, for example, the width of the metal or polysilicon in the vicinity of a via in some embodiments. When a via is placed in a wide metal region (e.g., a region having larger interconnect width values), this via may need more metal enclosure than a via placed in a narrower metal region (e.g., a region having smaller interconnect width values). In some embodiments where a via is partially in wide metal region and partially in non-wide metal region, this via may need different metal enclosures in different regions.

In this example illustrated in FIG. 9, the portion of the electronic design 902 "Top" includes a via 908 (e.g., a single, merged via shape from a plurality of vias) formed between a first metal shape 904 (e.g., a landing metal shape or a covering metal shape) on a first layer and a second metal shape 906 on a second metal layer. Although the metal shapes 904 and 906 appear to overlap the via 606 with some margin, it may be assumed that the overhang between the via 908 and the metal shape 904 (and/or the metal shape 906) is of some relatively small value that may pose difficulties for the subsequently executing discretizing module to mesh such a small region (e.g., the discretizing module may be forced to use very fine elements to discretize such a small region) and/or the analysis module(s) (e.g., an analysis module may be forced to expend more memory area to accommodate more elements created by the very fine elements and additional processor cycles in each iteration to solve for more nodes created by the very fine elements).

It shall be noted that this example also assumes that the shapes 904 and 906 in 902 "Top" are actual layout shapes and do not contain virtual edge(s) or virtual vertex (vertices) that may produce false errors. The simplification process may expand the metal shapes 904 to comply with the corresponding design rule in some embodiments or may shrink the via shape 908 (e.g., shrunk via shape 910 in FIG. 9) and update the simplified electronic design in some other embodiments. Shrinking the via shape 908 may further trigger the issuance of an IPC (inter-process call) to invoke the layout editor to adjust the corresponding plurality of vias upon which the single, merged via shape 908 is based.

An example application of the techniques described with reference to FIG. 9 may apply to the shape striping example illustrated in FIG. 8. For example, a via 832 may be located to interconnect 814 and 824. After the shape striping illustrated in FIG. 8 and described above is applied to this portion of the electronic design to arrive at the modified electronic design 802, the simplification process may also apply the techniques described with respect to FIG. 9 to modify the via 832 into the modified via 834 to comply with the controlling via enclosure rule while providing sufficient landing metal or covering metal with sufficient overhang for the modified via 834.

In the example illustrated in FIG. 10, the electronic design 1002 "Top" includes a shape 1004 having multiple small geometric features that may pose an issue for the subsequent discretization process or may result in elements with poor quality (e.g., elements that may cause numerical instability) or more elements for subsequent analyses.

In this example, the simplification process may modify the shape 1004 into the modified shape 1008 by replacing the multiple, smaller features with a straight edge. The location and size of the straight edge may be determined so that the original shape 1004 and the simplified shape 1008 in the modified electronic design 1006 have identical or substantially similar areas. It shall be noted that other simplification of the multiple, small geometric features may also be implemented based on, for example, accuracy requirements for the solution produced with the simplified shape 1008, criticality of the shape 1004, etc.

The location of the straight edge may be determined in several different manners. In some embodiments, the location of the straight edge may be determined so that the total area of the simplified shape 1008 has the same total area as the original shape 1004 so that the impact on the accuracy of cross-layer coupling capacitances involving the simplified shape 1008 may be reduced or eliminated. In some other embodiments, the location of the straight edge may be determined so that the impact on the accuracy of in-layer coupling capacitances involving the simplified shape 1008 and one or more neighboring shapes may be reduced or eliminated. In some other embodiments, the location of the straight edge may be determined so that a balanced compromise is reached to reduce the impact on both the cross-layer and in-layer coupling capacitances involving the simplified shape 1008.

In some embodiments, simplification with different levels of aggressiveness may be applied to a circuit component based in part or in whole upon, for example, an input pertaining to the circuit component or a circuit feature thereof to be simplified. In the example illustrated in FIG. 10, the original shape 1004 with multiple small steps may be more aggressively simplified (that the simplification applied to form the circuit component 1008) into the shape 1012 in the modified electronic design 1010 "Top"".

Figure 11:
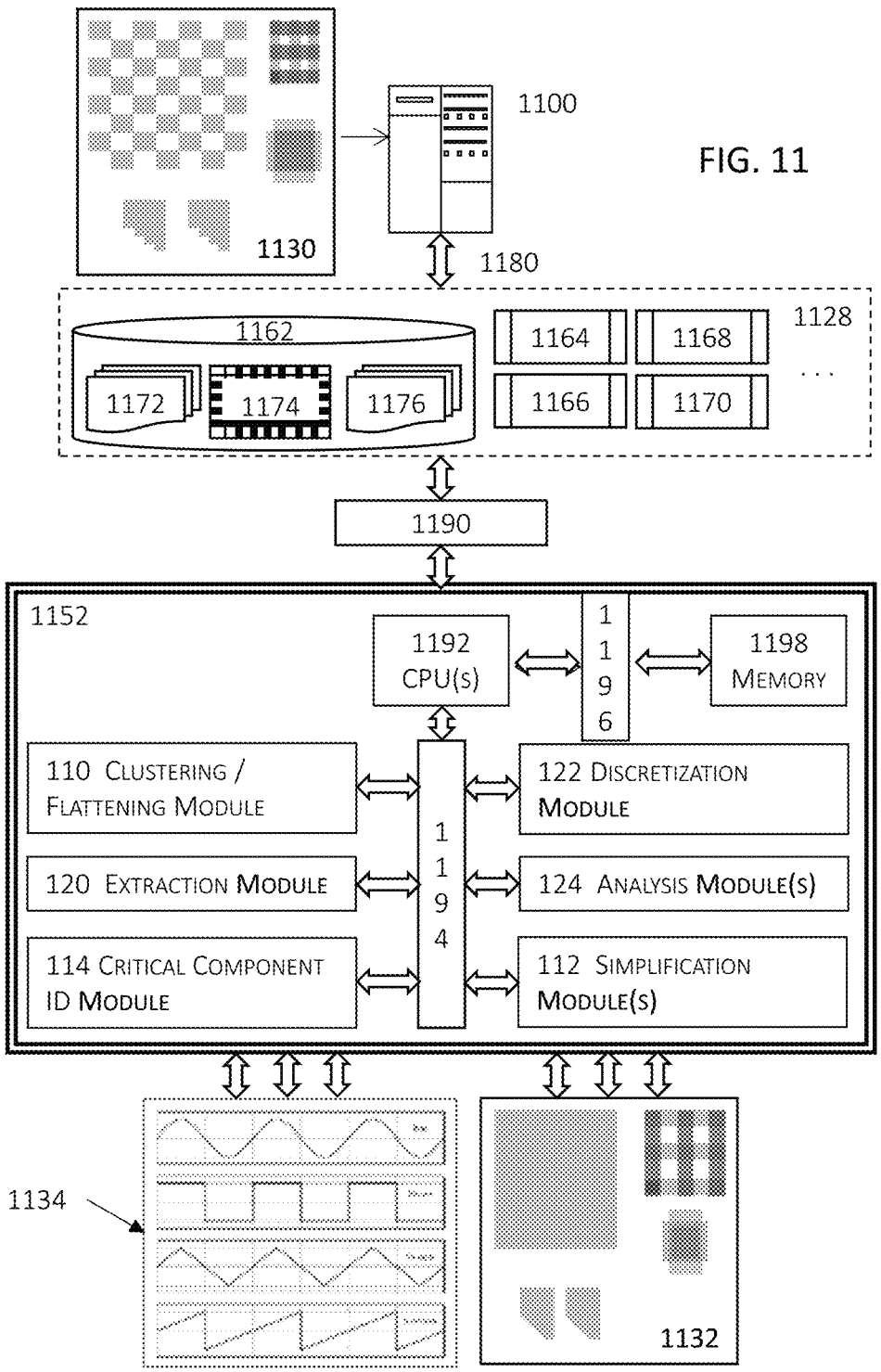
FIG. 11 illustrates an example computing system that characterizes electronic designs with electronic design simplification techniques described herein in one or more embodiments.

FIG. 11 illustrates an example computing system that characterizes electronic designs with electronic design simplification techniques described herein in one or more embodiments. More specifically, the computing system 1100 in FIG. 11 may comprise one or more computing systems 1100, such as a general-purpose computer described in the System Architecture Overview section to implement one or more special proposes. The illustrative system in FIG. 11 may include an Internet-based computing platform providing a shared pool of configurable computer processing resources (e.g., computer networks, servers, storage, applications, services, etc.) and data to other computers and devices in a ubiquitous, on-demand basis via the Internet. For example, one or more computing resources and/or modules illustrated in FIG. 11 may be located in a cloud computing platform in some embodiments.

In this illustrated system in FIG. 11, one or more computing systems 1100 may invoke and execute various modules to identify an electronic design 1130 (e.g., a layout including multiple metal layers in a flat or hierarchical structure, etc.). The one or more computing systems 1100 may invoke and execute a plurality of modules, which are specifically programmed and stored at least partially in memory of and functions in conjunction with at least one microprocessor (e.g., 1192) or processor core of the one or more computing systems 1100, to perform various functions to transform the identified electronic design 1130 into a simplified electronic design 1132.

For example, the one or more computing systems may execute a critical component identification module (114) that automatically identifies one or more critical electronic design components that will not be subject to clustering, simplification, etc. based in part or in whole upon, for example, one or more performance criteria, one or more reliability criteria, one or more manufacturing criteria, or any combinations thereof. The critical component identification module (114) may also receive user inputs for preserving an electronic design component so that this electronic design component will not be subject to subsequent clustering, simplification, etc.

The one or more computing systems may also execute a clustering and flattening module (110) to cluster a group of electronic design components into a single electronic design component while flattening the electronic design. This clustered, flattened electronic design may be provided to one or more simplification modules (112) that perform one or more simplification processes on the flattened, clustered electronic design as described above to generate a simplified electronic design (1132).

An extraction module (120) may be invoked or executed to perform one or more algorithms (e.g., an algorithm based on random walk theory) on the simplified electronic design to extract the connectivity (e.g., various connections in the electronic design, how various electronic design components are connected in the electronic design, etc.) With the connectivity extracted, the simplified electronic design (1132) may be provided to a discretization module (122) that discretizes shapes in a three-dimensional space or a two-and-a-half-dimensional (2.5D or hybrid-3D) space into respective collections of triangular or polygonal meshes or elements.

These collections of meshes or elements may be presented in a graphical user interface (GUI) for the user to review. The discretization module (122) may further determine the quality index of a collection of meshes or elements based on, for example, the ratio between the largest mesh(es) and the smallest mesh(es), the interior angles of the meshes or elements, etc. For example, a discretization module (122) may penalize the quality index of a mesh or element or a collection of meshes or elements for a shape when it is determined to exhibit an interior angle larger than a first threshold angle or smaller than a second threshold angle. A mesh or element with an overly large interior angle (or an overly small interior angle) may cause numerical instability and affect the performance of an analysis module (124).

With the collections of meshes or elements generated for the shapes in the simplified electronic design (1132), a model including the meshes or elements and optionally one or more artificial metal patches that provide return current path(s) may be generated for the electronic design and provided to one or more analysis modules (124). In some embodiments, these one or more analysis modules may analyze or characterize the model with the Kirchhoff's circuit equations to obtain various nodal solutions (e.g., voltages, currents, etc.) at various nodes of interest in the model and may further analyze the model using the nodal solutions and the Maxwell equation to obtain the electrical behaviors (e.g., waveforms, nodal values, electric field distribution, etc.) of the simplified electronic design.

In some other embodiments, an analysis module combines the Maxwell equation for the model with the Kirchhoff's circuit equations into a single matrix formulation and solve this single matrix formulation to determine the electrical behaviors (e.g., waveforms, nodal values, electric field distribution, etc.) of the simplified electronic design. For example, some embodiments may model an embedded multi-node electronic design to accurately handle equipotential port grouping with the following matrix formulation:

$$\begin{bmatrix} Y_{FEM} & 0 & C \\ 0 & Y_{circuit} & I \\ C^T & I & 0 \end{bmatrix} \times \begin{bmatrix} E \\ V_{circuit} \\ I_{circuit} \end{bmatrix} = [I_{source}]$$

In the coefficient matrix of the above matrix formulation, $Y_{FEM}$ denotes admittance matrix of finite element equations; $Y_{circuit}$ denotes admittance matrix of circuit equations; C denotes coupling terms between finite element unknowns and circuit unknowns; I denotes identity matrix; and $C^T$ denotes transpose of C. In the variables, E denotes finite element unknowns (electric field); $V_{circuit}$ denotes voltage; and $I_{circuit}$ denotes current. $I_{source}$ on the right-hand side denotes the current source vector. With this matrix formulation, a solver such as an electromagnetic solver can solve for the electromagnetic field together with embedded multi-node circuits, without setting up ports as circuit nodes then combine s-parameter and multi-node circuits in a simulator as conventional approaches do.

The predicted or determined behavior (1134) of the electronic design is then classified according to, for example, its deviation from the corresponding specification and may be provided to a designer for further consideration of whether the electronic design is to be modified. These predicted electrical behaviors (1134) from the one or more analysis modules (124) may further be provided to one or more EDA (electronic design automation) tools to implement, modify, optimize, perform sign-off and design closure. The present invention may provide a final version (e.g., a signed-off version) of the electronic design as an input to the manufacturing or fabrication equipment (e.g., photomask manufacturing equipment, lithographic equipment, etc.) so as to cause the manufacturing of the underlying electronic circuits to occur.

The present invention provides a more efficient and more accurate solution to address at least the shortcomings and problems with conventional approaches. Actual benchmarks on real-world electronic designs have shown that the present invention reduces an example electronic design having over eight (8) millions of devices into a simplified electronic design with fewer than 200,000 devices with simplified geometries in only a few seconds (around 2 seconds). Moreover, this simplified electronic design provides almost equally good electrical behavior predictions as the original, non-simplified electronic design, while consuming a much smaller amount of computing resources in subsequent analyses due to the much smaller, simplified electronic design. That is, the present invention drastically improves the runtime while producing electrical behaviors with nearly identical accuracy.

In some embodiments, the one or more computing systems 1100 may invoke various system resources such as the processor(s) or processor core(s), memory, disks, etc. The one or more computing systems 1100 may also initiate or interact with other computing systems to access, via a computer bus architecture (e.g., a system bus, a control bus, a data bus, or any combinations thereof), various resources 1128 that may comprise a floorplanner, a global routing engine, and/or a detail routing engine 1164, a layout editor 1166, a design rule checker 1168, a verification engine 1170, etc.

These various resources 1128 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 1130 based in whole or in part upon the results 1134) is finalized for tapeout; and the electronic design is transmitted to mask fabrication equipment for mask preparation and mask writing to produce photomasks that are then used in the actual manufacturing of the electronic circuits 1134 represented by the electronic design.

The one or more computing systems 1100 may further write to and read from a local or remote (e.g., networked storage device(s)) non-transitory computer accessible storage 1162 that stores thereupon data or information such as, but not limited to, one or more databases (1174) such as schematic design database(s) or physical design database(s), electronic circuit design specification database(s), techfiles for multiple design fabrics, various statistics, various data, rule decks, various design rules, constraints, etc. (1172), or other information or data (1176) that may be used to facilitate the performance of various functions to achieve the intended purposes. The one or more databases may also include, for example, one or more data structures for facilitating clustering, flattening, simplification, etc. in electronic designs.

In some embodiments, the computing system 1100 may include the various resources 1128 such that these various resources may be invoked from within the computing system via a network or a computer bus 1180 (e.g., an internet session, an intranet session, a data bus interfacing a microprocessor 1192 and the non-transitory computer accessible storage medium 1198 or a system bus 1190 between a microprocessor 1192 and one or more engines in the various resources 1128). In some other embodiments, some or all of these various resources may be located remotely from the computing system 1100 such that the computing system may access the some or all of these resources via a computer bus 1180 and one or more network components.

The computing system may also include one or more modules in the set of modules 1152. One or more modules in the set 1152 may include or at least function in conjunction with a microprocessor 1192 via a computer bus 1194 to access or invoke various modules in 1152 (e.g., 110, 112, 114, 120, and 122 described above) in some embodiments. In these embodiments, a single microprocessor 1192 may be included in and thus shared among more than one module even when the computing system 1100 includes only one microprocessor 1192. A microprocessor 1192 may further access some non-transitory memory 1198 (e.g., random access memory or RAM) via a system bus 1196 to read and/or write data during the microprocessor's execution of processes.

The set of modules 1152 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 1152 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 1100 may include the various resources 1128 such that these various resources may be invoked from within the computing system via a computer bus 1180 (e.g., a data bus interfacing a microprocessor 1192 and the non-transitory computer accessible storage medium 1198 or a system bus 1190 between a microprocessor 1192 and one or more engines in the various resources 1128). In some other embodiments, some or all of these various resources may be located remotely from the computing system 1100 such that the computing system may access the some or all of these resources via a computer bus 1180 and one or more network components.

The computing system may also include one or more modules in the set of modules 1152. One or more modules in the set 1152 may include or at least function in tandem with a microprocessor 1192 via a computer bus 1194 in some embodiments. In these embodiments, a single microprocessor 1192 may be included in and thus shared among more than one module even when the computing system 1100 includes only one microprocessor 1192. A microprocessor 1192 may further access some non-transitory memory 1198 (e.g., random access memory or RAM) via a system bus 1196 to read and/or write data during the microprocessor's execution of processes.

The one or more computing systems 1100 may invoke and execute one or more modules in 1128 and/or 1152 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 1100 for execution.

Figure 12A:
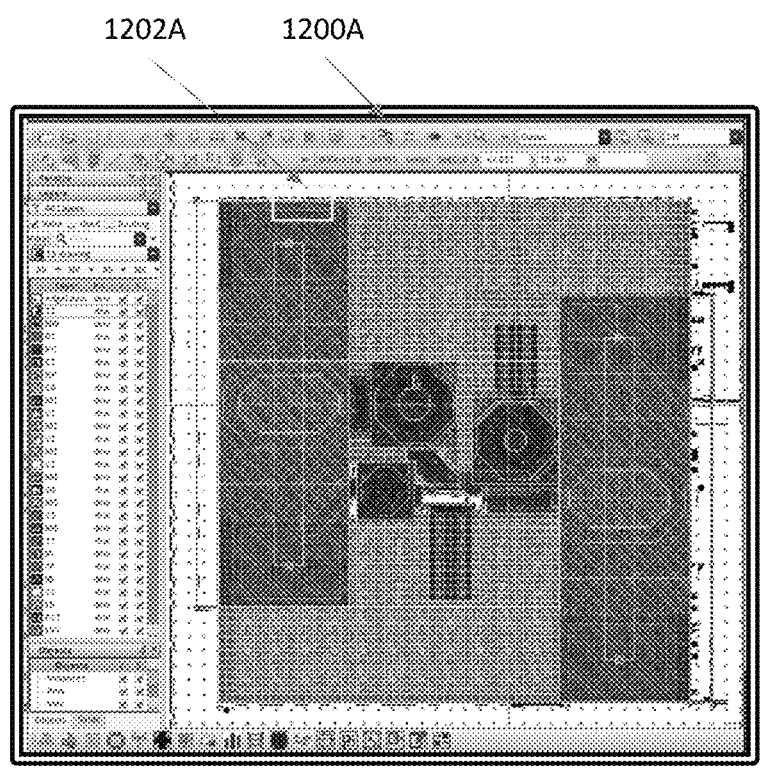
FIGS. 12A-D illustrates some working examples of the application of certain techniques described herein to an example electronic design in one or more embodiments.
Figure 12B:
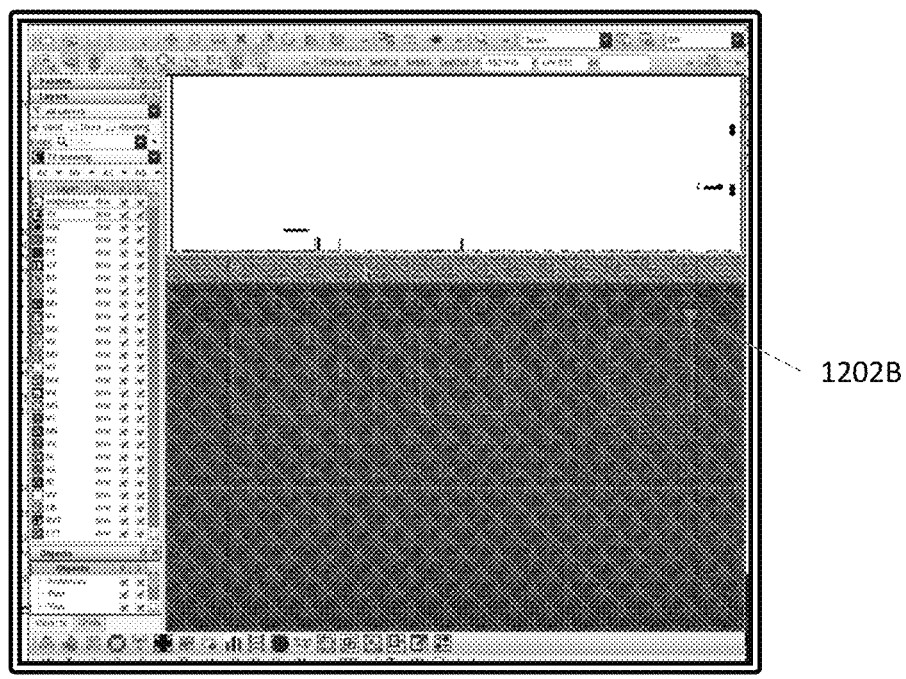

FIGS. 12A-D illustrates some working examples of the application of certain techniques described herein to an example electronic design in one or more embodiments. More specifically, FIG. 12A illustrates an example electronic design 1200A. The original electronic design has over eight (8) millions of devices. A zoom-in portion 1202A showing more detailed information is illustrated in FIG. 12B. More particularly, FIG. 12B illustrates a group of vias 1202B as originally designed in the electronic design.

This group of vias may pose difficulties for an analysis module due to, for example, the relatively small size(s) of the vias, the relatively small spacing value(s) of these vias when compared to the sizes of other features of other circuit components in the layout, and/or the numerosity of such small vias as well other small circuit features. For example, in order to better resolve a relatively small via (as compared to other circuit features having relatively large size), a discretizing module needs to use even smaller meshes or elements to represent a via. As a result, as the number of such relatively small circuit features increases, the total number of elements and hence the size of the model representing the electronic design increases, and the matrices corresponding to the nodes of each mesh or element increases. Such increases may prohibitively drag down or even stall the performance of even a modern, state-of-the-art computing system during simulation.

Figure 12C:
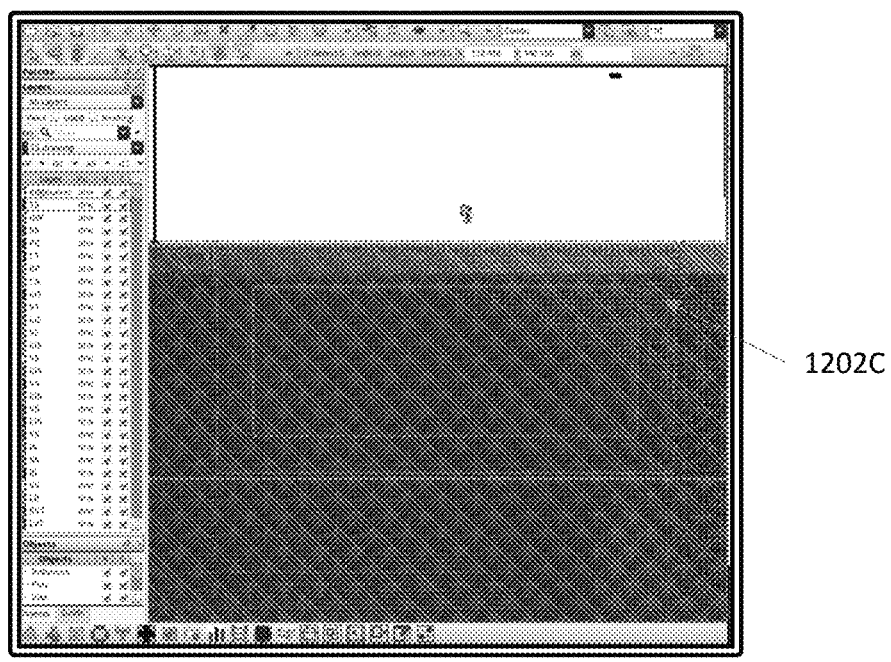

FIG. 12C illustrates the same portion of the electronic design illustrated in FIG. 12B after the application of the clustering or simplification techniques described herein. As illustrated in FIG. 12C, the group of vias 1202B illustrated in FIG. 12B is now merged into a single circuit component 1202C having the same physical and electrical properties yet with different, much simpler geometries. Such simplification of the group of relatively small vias 1202B into the single circuit component 1202C greatly reduces the total number of circuit components as well as the complexities of the underlying electronic design in the model for characterization and analysis.

Figure 12D:
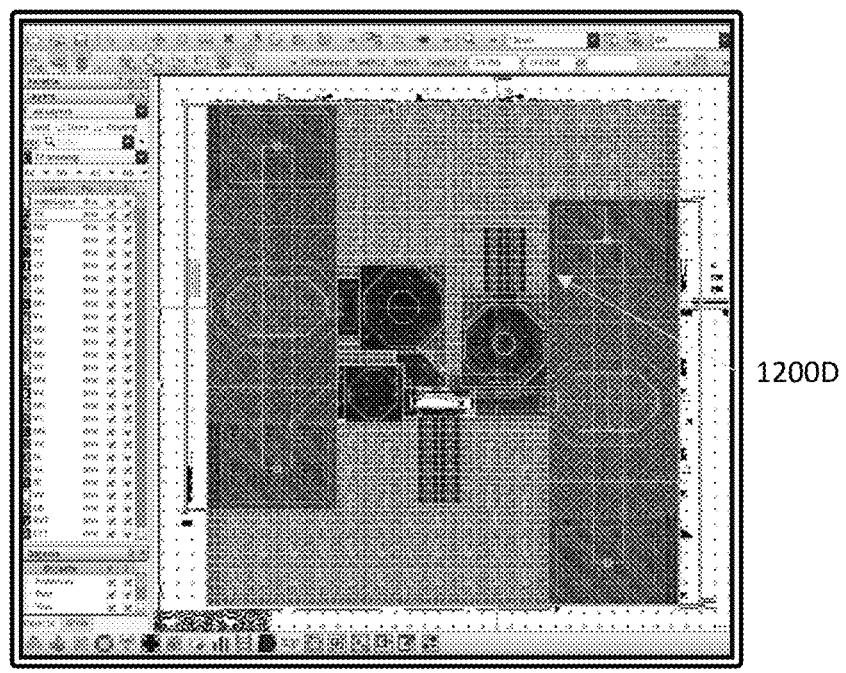

FIG. 12D illustrates a simplified electronic design 1200D from the original electronic design 1200A. In these examples illustrated in FIGS. 12A-D, the application of the techniques described herein reduces the original electronic design having over eight (8) millions of shapes into a simplified electronic design with less than two-hundred thousand (200,000) shapes within three seconds as compared to nearly seven days with the state-of-the-art electronic design automation tool on the same computing system.

A benchmark testing of a prototype of the electronic design automation tool described herein demonstrates the efficiency and accuracy of the techniques described herein. In this benchmark testing, the techniques described herein are applied to the example electronic design in FIGS. 12A-D having over eight (8) millions of shapes. The prototype completed the flattening, clustering, connectivity extraction, and simplification to generate a simplified electronic design with fewer than two-hundred thousand (200,000) shapes within three seconds as compared to nearly seven days with the state-of-the-art electronic design automation tool on the same computing system. The results of subsequent EM (electromagnetic) analyses with the simplified electronic design generated with the techniques described herein also revealed that the analysis results at least as accurate, if not more accurate than the results produced by the state-of-the-art electronic design automation tool.

System Architecture Overview

Figure 13:
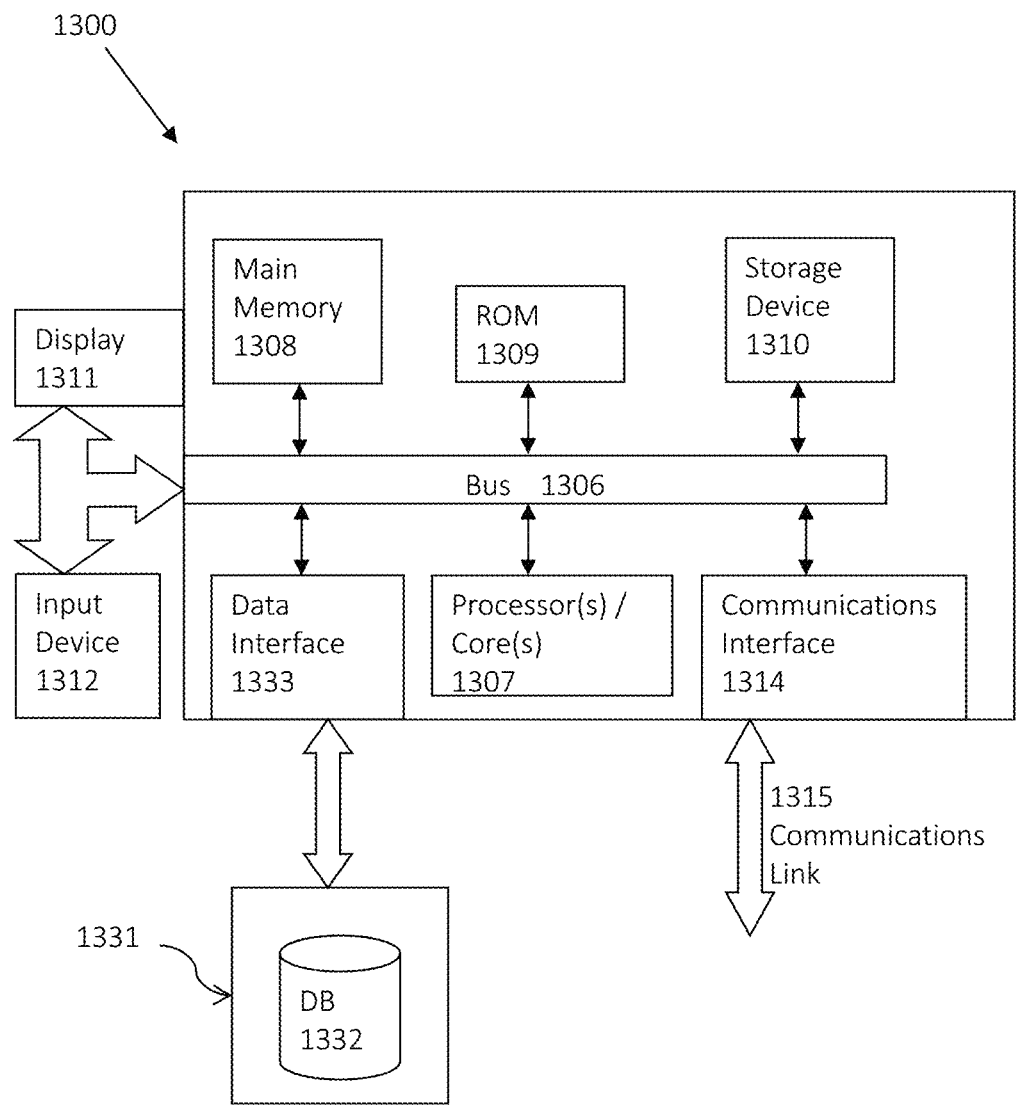
FIG. 13 illustrates a computerized system on which a method for characterizing electronic designs with electronic design simplification techniques may be implemented.

FIG. 13 illustrates a computerized system on which a method for characterizing electronic designs with electronic design simplification techniques may be implemented. Computer system 1300 includes a bus 1306 or other communication module for communicating information, which interconnects subsystems and devices, such as processor 1307, system memory 1308 (e.g., RAM), static storage device 1309 (e.g., ROM), disk drive 1310 (e.g., magnetic or optical), communication interface 1314 (e.g., modem or Ethernet card), display 1311 (e.g., CRT or LCD), input device 1312 (e.g., keyboard), and cursor control (not shown). The illustrative computing system 1300 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 1300 may include or may be a part of a cloud computing platform in some embodiments.

According to one embodiment, computer system 1300 performs specific operations by one or more processor or processor cores 1307 executing one or more sequences of one or more instructions contained in system memory 1308. Such instructions may be read into system memory 1308 from another computer readable/usable storage medium, such as static storage device 1309 or disk drive 1310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1307, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 1307 for execution. Such a medium may take many forms, including but not limited to, non-volatile media and volatile media. Non-volatile media includes, for example, optical or magnetic disks, such as disk drive 1310. Volatile media includes dynamic memory, such as system memory 1308. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1300. According to other embodiments of the invention, two or more computer systems 1300 coupled by communication link 1315 (e.g., LAN, PTSN, or wireless network) may perform the sequence of instructions required to practice the invention in coordination with one another.

Computer system 1300 may transmit and receive messages, data, and instructions, including program (e.g., application code) through communication link 1315 and communication interface 1314. Received program code may be executed by processor 1307 as it is received, and/or stored in disk drive 1310, or other non-volatile storage for later execution. In an embodiment, the computer system 1300 operates in conjunction with a data storage system 1331, e.g., a data storage system 1331 that includes a database 1332 that is readily accessible by the computer system 1300. The computer system 1300 communicates with the data storage system 1331 through a data interface 1333. A data interface 1333, which is coupled to the bus 1306 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 1333 may be performed by the communication interface 1314.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for characterizing electronic designs with electronic design simplification techniques, comprising:
    identifying an input for performing layout simplification on an electronic design;
    generating, by a microprocessor or a processor core, a simplified electronic design at least by performing a first processing of a first aggressiveness level for the layout simplification on a first portion of the electronic design and a second processing of a second aggressiveness level for a second portion of the electronic design, wherein the first processing and the second processing are determined based in part or in whole upon the input;
    determining a characterization input for characterizing the simplified electronic design; and
    characterizing an electromagnetic behavior of the simplified electronic design using at least the characterization input.

2. The computer implemented method of claim 1, wherein identifying the input for performing the layout simplification comprises:
    identifying a criterion pertaining to performance, reliability, or manufacturing of the electronic design as the input; and
    identifying a circuit component or a first circuit feature thereof pertaining to the criterion, wherein the first aggressiveness level of the first processing is more aggressive than the second aggressiveness level of the second processing.

3. The computer implemented method of claim 2, wherein identifying the input for performing the layout simplification further comprises:
    identifying, through user interface, a user-specified circuit component or a second circuit feature thereof.

4. The computer implemented method of claim 1, wherein generating the simplified electronic design comprises:
    clustering a group of circuit components on a layer in a stack of multiple layers in the electronic design based at least in part upon one or more threshold values pertaining to the layer; and
    flattening the layer at least by bringing circuit components on the layer to a hierarchy.

5. The computer implemented method of claim 1, wherein generating the simplified electronic design comprises:
    merging a collection of circuit components on a layer in a stack of multiple layers of the electronic design into a single circuit component, where individual circuit components in the collection have a same material or different materials, and the individual circuit components comprise a plurality of interconnects or wires that are merged into a single interconnect or wire; and
    creating one or more openings in the single circuit component at least by removing material of the single circuit component in the one or more openings.

6. The computer implemented method of claim 1, wherein generating the simplified electronic design comprises:
    removing a dangling circuit component from the electronic design, where the dangling circuit component is not connected to other circuit components in the electronic design.

7. The computer implemented method of claim 1, wherein generating the simplified electronic design comprises:
    simplifying geometries in the electronic design at least by replacing a more complex geometric circuit feature with at least one simpler geometric feature.

8. The computer implemented method of claim 1, wherein generating the simplified electronic design comprises:
    identifying a first set of circuit components in a first flattened layer and a second set of circuit components in a second flattened layer in the electronic design, wherein the first flattened layer and the second flattened layer have been flattened onto two separate hierarchies;
    performing striping on the first set and the second set at least by modifying a dimension, a size, or a location of a circuit component in either or both of the first set and the second set of circuit components; and
    adjusting an interconnecting circuit component that connects a first circuit component in the first set and the second circuit component in the second set based at least in part upon results of the striping on the first set and the second set.

9. The computer implemented method of claim 8, wherein characterizing the electromagnetic behavior of the simplified electronic design comprises:
    adding an artificial metal plane with respect to the layer or the stack of the multiple layers in the simplified electronica design based at least in part upon the one or more openings.

10. The computer implemented method of claim 1, wherein determining the characterization input comprises:
   extracting connectivity from the simplified electronic design;
   identifying a set of stimuli for characterizing the electromagnetic behavior;
   identifying a discretization criterion for meshing the simplified electronic design into a collection of elements; and
   identifying the connectivity, the set of stimuli, or the discretization criterion as the characterization input.

11. A system for characterizing electronic designs with electronic design simplification techniques, comprising:
   non-transitory computer accessible storage medium storing thereupon program code;
   a module stored at least partially in memory of and functioning in conjunction with at least one microprocessor or a processor core of a computing system, wherein the at least one microprocessor or the processor core of the computing system is configured to execute the module at least to:
   identify an input for performing layout simplification on an electronic design;
   generate, by a microprocessor or a processor core, a simplified electronic design at least by performing a first processing of a first aggressiveness level for the layout simplification on a first portion of the electronic design and a second processing of a second aggressiveness level for a second portion of the electronic design, wherein the first processing and the second processing are determined based in part or in whole upon the input;
   determine a characterization input for characterizing the simplified electronic design; and
   characterize an electromagnetic behavior of the simplified electronic design using at least the characterization input.

12. The system for claim 11, wherein the microprocessor or processor core that is configured to execute the module is further configured to:
   identify a criterion pertaining to performance, reliability, or manufacturing of the electronic design as the input; and
   identify a circuit component or a first circuit feature thereof pertaining to the criterion wherein the first aggressiveness level of the first processing is more aggressive than the second aggressiveness level of the second processing.

13. The system for claim 11, wherein the microprocessor or processor core that is configured to execute the module is further configured to:
   identify, through user interface, a user-specified circuit component or a second circuit feature thereof;
   cluster a group of circuit components on a layer in a stack of multiple layers in the electronic design based at least in part upon one or more threshold values pertaining to the layer; and
   flatten the layer at least by bringing circuit components on the layer to a hierarchy.

14. The system for claim 11, wherein the microprocessor or processor core that is configured to execute the module is further configured to:
   merge a collection of circuit components on a layer in a stack of multiple layers of the electronic design into a single circuit component, where individual circuit components in the collection have a same material or different materials, and the individual circuit components comprise a plurality of interconnects or wires that are merged into a single interconnect or wire;
   create one or more openings in the single circuit component at least by removing material of the single circuit component in the one or more openings;
   remove a dangling circuit component from the electronic design, where the dangling circuit component is not connected to other circuit components in the electronic design; or
   simplify geometries in the electronic design at least by replacing a more complex geometric circuit feature with at least one simpler geometric feature.

15. The system for claim 14, wherein the at least one micro-processor that is configured to execute at least the one or more interference reduction modules is further configured to:
   identify a first set of circuit components in a first flattened layer and a second set of circuit components in a second flattened layer in the electronic design, wherein the first flattened layer and the second flattened layer have been flattened onto two separate hierarchies;
   perform striping on the first set and the second set at least by modifying a dimension, a size, or a location of a circuit component in either or both of the first set and the second set of circuit components;
   adjust an interconnecting circuit component that connects a first circuit component in the first set and the second circuit component in the second set based at least in part upon results of the striping on the first set and the second set; and
   add an artificial metal plane with respect to the layer or the stack of the multiple layers in the simplified electronica design based at least in part upon the one or more openings.

16. An article of manufacture comprising a non-transitory computer accessible storage medium having stored thereupon a sequence of instructions which, when executed by at least one processor or at least one processor core executing one or more threads, causes the at least one microprocessor or the at least one processor core to perform a set of acts for characterizing electronic designs with electronic design simplification techniques, the set of acts comprising:
   identifying an input for performing layout simplification on an electronic design;
   generating, by a microprocessor or a processor core, a simplified electronic design at least by performing a first processing of a first aggressiveness level for the layout simplification on a first portion of the electronic design and a second processing of a second aggressiveness level for a second portion of the electronic design, wherein the first processing and the second processing are determined based in part or in whole upon the input;
   determining a characterization input for characterizing the simplified electronic design; and
   characterizing an electromagnetic behavior of the simplified electronic design using at least the characterization input.

17. The article of manufacture of claim 16, wherein determining the characterization input comprises:
   extracting connectivity from the simplified electronic design;
   identifying a set of stimuli for characterizing the electromagnetic behavior;
   identifying a discretization criterion for meshing the simplified electronic design into a collection of elements; and identifying the connectivity, the set of stimuli, or the discretization criterion as the characterization input.

18. The article of manufacture of claim 16, the set of acts further comprising:
   identifying a criterion pertaining to performance, reliability, or manufacturing of the electronic design as the input; and
   identifying a circuit component or a first circuit feature thereof pertaining to the criterion, wherein the first aggressiveness level of the first processing is more aggressive than the second aggressiveness level of the second processing.

19. The article of manufacture of claim 16, the set of acts further comprising:
   clustering a group of circuit components on a layer in a stack of multiple layers in the electronic design based at least in part upon one or more threshold values pertaining to the layer;
   flattening the layer at least by bringing circuit components on the layer to a hierarchy;
   merging a collection of circuit components on a layer in a stack of multiple layers of the electronic design into a single circuit component, where individual circuit components in the collection have a same material or different materials, and the individual circuit components comprise a plurality of interconnects or wires that are merged into a single interconnect or wire;
   creating one or more openings in the single circuit component at least by removing material of the single circuit component in the one or more openings;
   removing a dangling circuit component from the electronic design, where the dangling circuit component is not connected to other circuit components in the electronic design; or
   simplifying geometries in the electronic design at least by replacing a more complex geometric circuit feature with at least one simpler geometric feature.

20. The article of manufacture of claim 16, the set of acts further comprising:
   identifying a first set of circuit components in a first flattened layer and a second set of circuit components in a second flattened layer in the electronic design, wherein the first flattened layer and the second flattened layer have been flattened onto two separate hierarchies;
   performing striping on the first set and the second set at least by modifying a dimension, a size, or a location of a circuit component in either or both of the first set and the second set of circuit components;
   adjusting an interconnecting circuit component that connects a first circuit component in the first set and the second circuit component in the second set based at least in part upon results of the striping on the first set and the second set,
   adding an artificial metal plane with respect to the layer or the stack of the multiple layers in the simplified electronica design based at least in part upon the one or more openings.

* * * * *